US009347370B2

(12) United States Patent
Herbruck et al.

(10) Patent No.: US 9,347,370 B2
(45) Date of Patent: May 24, 2016

(54) ROTARY INTERNAL COMBUSTION ENGINE, GAS COMPRESSOR, AND LIQUID PUMP

(71) Applicant: GoTek Energy, Inc., Oak View, CA (US)

(72) Inventors: Steven Lee Herbruck, Ojai, CA (US); Bradley Scott Farrenkopf, Moorpark, CA (US)

(73) Assignee: GoTek Energy, Inc., Oak View, CA (US)

( * ) Notice: Subject to any disclaimer, the term of this patent is extended or adjusted under 35 U.S.C. 154(b) by 170 days.

(21) Appl. No.: 13/843,646

(22) Filed: Mar. 15, 2013

(65) Prior Publication Data

US 2014/0261290 A1  Sep. 18, 2014

(51) Int. Cl.
| | |
|---|---|
| *F02B 53/00* | (2006.01) |
| *F02B 55/08* | (2006.01) |
| *F01C 1/32* | (2006.01) |
| *F01C 19/02* | (2006.01) |
| *F01C 19/08* | (2006.01) |
| *F01C 21/08* | (2006.01) |
| *F01C 21/10* | (2006.01) |

(52) U.S. Cl.
CPC . *F02B 55/08* (2013.01); *F01C 1/32* (2013.01); *F01C 19/02* (2013.01); *F01C 19/08* (2013.01); *F01C 21/0809* (2013.01); *F01C 21/106* (2013.01); *Y02T 10/17* (2013.01); *Y10T 29/49234* (2015.01)

(58) Field of Classification Search
CPC .... F02B 55/08; F01C 21/106; F01C 21/0809; F01C 19/08; F01C 19/02; F01C 1/32; F01C 21/06; F01C 21/104; Y02T 10/17; Y02T 29/49234

USPC .............. 123/90.11, 300, 316, 317, 435, 525, 123/532, 241; 418/168
See application file for complete search history.

(56) References Cited

U.S. PATENT DOCUMENTS

| | | | | | |
|---|---|---|---|---|---|
| 2,263,275 | A | * | 11/1941 | Pieper | 123/206 |
| 2,639,855 | A | * | 5/1953 | Daniels | F04C 18/3442 418/15 |
| 3,139,233 | A | * | 6/1964 | Simonsen | 418/122 |
| 3,139,836 | A | * | 7/1964 | Jungbluth | F02B 55/16 418/83 |
| 3,827,838 | A | * | 8/1974 | Prasse | 418/142 |
| 3,849,037 | A | * | 11/1974 | Downs | 418/122 |
| 3,989,424 | A | * | 11/1976 | Goloff | F01C 21/10 123/41.41 |
| 4,044,589 | A | * | 8/1977 | Waimsley | B21D 51/16 29/888.012 |
| 4,241,713 | A | | 12/1980 | Crutchfield | |
| 6,164,263 | A | | 12/2000 | Saint-Hilaire et al. | |
| 6,668,767 | B1 | | 12/2003 | Sanchez Talero et al. | |
| 6,776,136 | B1 | * | 8/2004 | Kazempour | 123/243 |
| 6,813,989 | B2 | | 11/2004 | Santiyanont | |

(Continued)

OTHER PUBLICATIONS

International Search Report and Written Opinion of International Application No. PCT/US14/18208; Jun. 17, 2014; 15 pages.

*Primary Examiner* — Jorge Pereiro
*Assistant Examiner* — Jason T Newton
(74) *Attorney, Agent, or Firm* — Armstrong Teasdale LLP

(57) ABSTRACT

A rotatory internal combustion engine is provided. The engine includes a power module, wherein all moving parts of the engine are positioned within the power module, a housing including an intake and an exhaust, wherein the housing is configured to retain the power module, and a sleeve configured to couple in the housing, the sleeve including a sleeve intake and a sleeve exhaust.

21 Claims, 28 Drawing Sheets

(56) References Cited

U.S. PATENT DOCUMENTS

| | | |
|---|---|---|
| 7,255,086 B2 | 8/2007 | Kovalenko |
| 7,353,784 B2 | 4/2008 | Nicholson, IV |
| 7,721,685 B2 | 5/2010 | Page |
| 8,448,417 B1 | 5/2013 | Farber |
| 2011/0139116 A1* | 6/2011 | Herbruck ...................... 123/244 |
| 2011/0200473 A1 | 8/2011 | Pekrul |

* cited by examiner

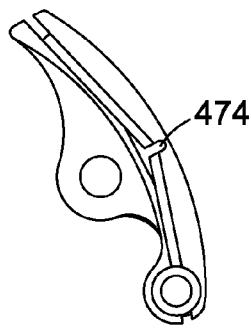
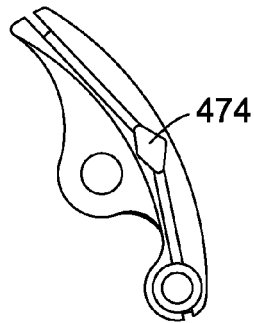
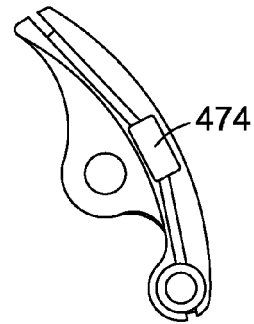
FIG. 13A    FIG. 13B    FIG. 13C
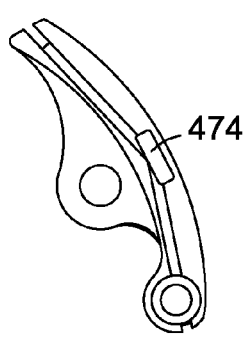
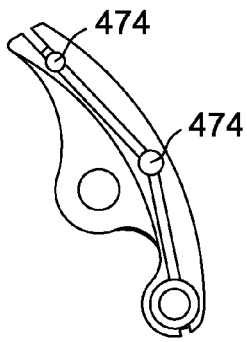
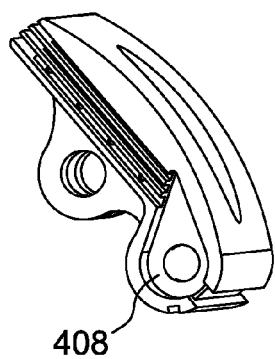
FIG. 13D    FIG. 13E    FIG. 13F

ROTARY INTERNAL COMBUSTION ENGINE, GAS COMPRESSOR, AND LIQUID PUMP

BACKGROUND

The embodiments described herein relate generally to internal combustion engines and more specifically to rotary internal combustion engines. The embodiments described herein also relate generally to gas compressors and liquid pumps in the case where the engine has its shaft driven by an electric motor or engine.

Generally, piston engines are inefficient internal combustion engines. For example, gasoline piston engines have an efficiency of about 25%-35% and direct injection diesel engines may be about 40% efficient. To increase the efficiency and/or lower the mass of internal combustion engines, a variety of rotary internal combustion engines have been introduced. However, known rotary internal combustion engines lack sealing capabilities that maintain constant combustion chamber pressures over extended periods of use, fail to have optimal combustion burn resulting in high temperatures and poor fuel economy, produce lower than desired torque, and/or are limited in RPM due to cam follower mechanical configurations which float.

Generally, piston and scroll compressors and pumps are inefficient.

BRIEF DESCRIPTION

In one aspect, a rotatory internal combustion engine is provided. The engine includes a power module, wherein all moving parts of the engine are positioned within the power module, a housing including an intake and an exhaust, wherein the housing is configured to retain the power module, and a sleeve configured to couple in the housing, the sleeve including a sleeve intake and a sleeve exhaust.

In another aspect, a housing assembly for use in a rotary internal combustion engine is provided. The housing assembly includes a housing including an intake and an exhaust, wherein the housing is configured to retain a power module for the internal combustion engine, and a sleeve configured to couple in the housing, the sleeve including a sleeve intake and a sleeve exhaust.

In yet another aspect, a method of manufacturing a rotary internal combustion engine is provided. The method includes providing a housing including an intake and an exhaust, coupling a sleeve in the housing, the sleeve including a sleeve intake and a sleeve exhaust, and coupling a power module within the sleeve, wherein all moving parts of the engine are positioned within the power module is provided.

BRIEF DESCRIPTION OF THE DRAWINGS

FIGS. 1-25 show exemplary embodiments of a rotary internal combustion engine, gas compressor, and/or liquid pump described herein.

FIG. 1 is a perspective view of an assembled exemplary rotary internal combustion engine.

FIG. 2 is an exploded partial perspective view of the rotary internal combustion engine shown in FIG. 1.

FIG. 3 is a perspective view of a rotor for use with the engine shown in FIG. 1.

FIG. 4 is an end view of a rotor located inside the engine housing shown in FIG. 1.

FIG. 5 is an inside perspective view of the ring plate shown in FIG. 2.

FIG. 9 is a perspective view of a piston assembly, such as the piston assembly shown in FIG. 2.

FIG. 10 is a perspective view of an exemplary piston head shown in FIG. 9.

FIGS. 13A-13F are side and perspective views of piston sealing channels and pivot connections that can be used with the piston head shown in FIG. 10.

FIG. 16 is a perspective view of a partially assembled piston head, such as the piston head shown in FIG. 12D.

FIG. 17 is a perspective view of an exemplary piston sleeve for use with the piston head shown in FIG. 16.

FIG. 18 is a perspective view of a sleeve and sealing assembly for use in the piston head shown in FIG. 16.

FIG. 22 is an exploded view of an exemplary housing assembly and sleeve, such as the housing assembly and sleeve shown in FIG. 2.

FIG. 23 is a perspective view of an alternative housing for use in the housing assembly shown in FIG. 2.

FIG. 24 is a perspective view of port shapes that can be used in the housing assembly or sleeve shown in FIG. 2.

FIG. 25 is a perspective view of an alternative housing that can be used in the housing assembly shown in FIG. 2.

DETAILED DESCRIPTION OF THE DISCLOSURE

Figure 1:
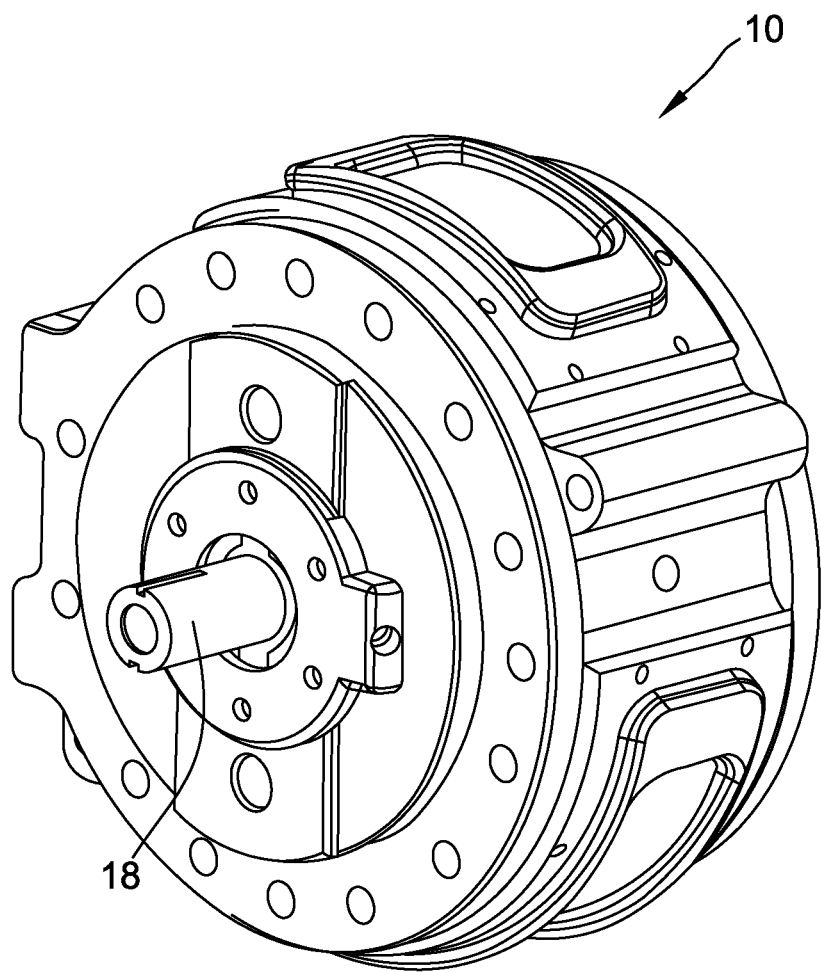
Figure 2:
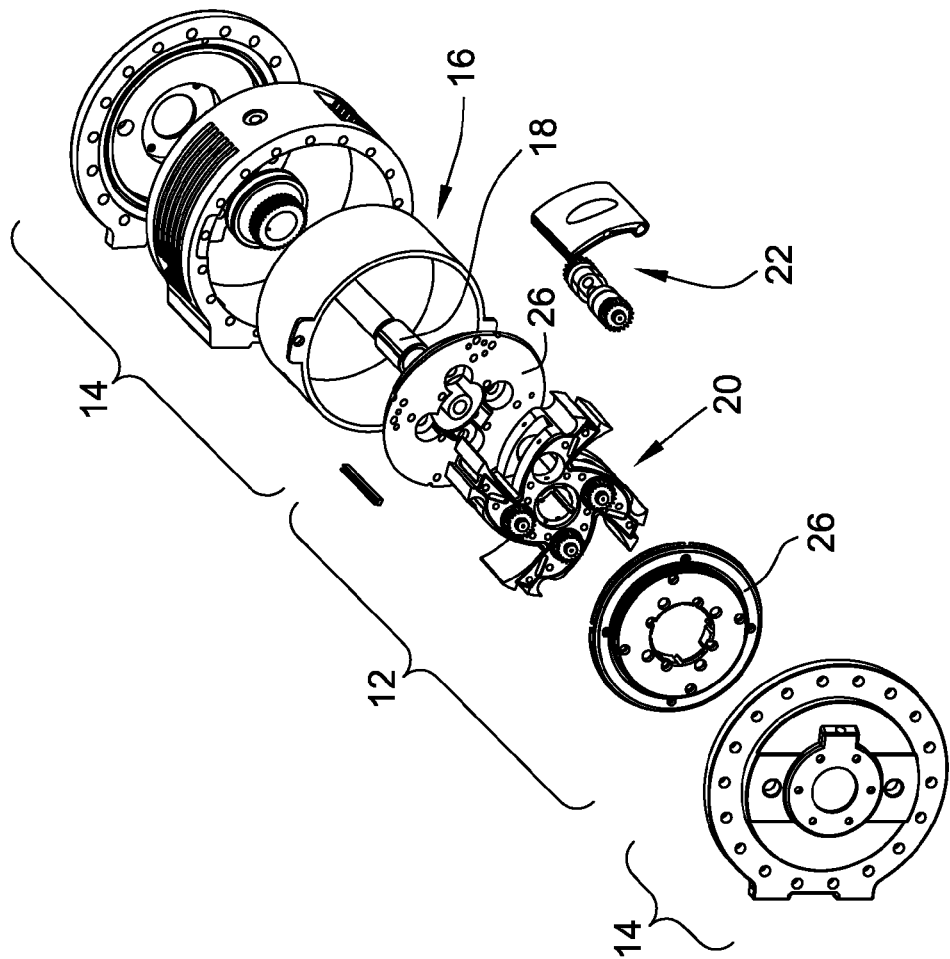

FIG. 1 is perspective view of an assembled exemplary rotary internal combustion engine 10 and FIG. 2 is an exploded view of the rotary internal combustion engine 10 shown in FIG. 1. Engine 10 includes a removable power module 12, engine housing assembly 14, and a sleeve 16. In the exemplary embodiment, power module 12 is removably inserted into engine housing 14 and is configured to rotate within housing assembly 14 to provide rotational energy. The rotational energy that is produced by power module 12 is transferred to a main crankshaft 18. In the exemplary embodiment, power module 12 includes a rotor 20, main crankshaft 18, at least one piston assembly 22, and two power module ring plates 26.

Power Module

Figure 3:
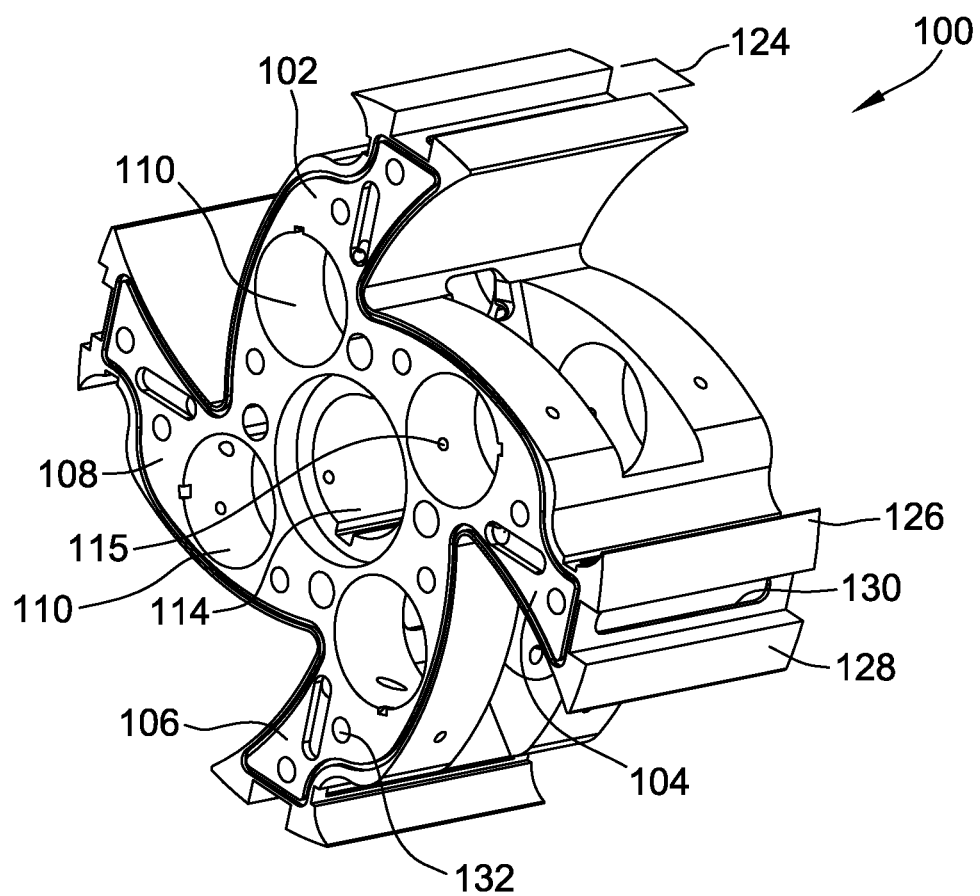
Figure 4:
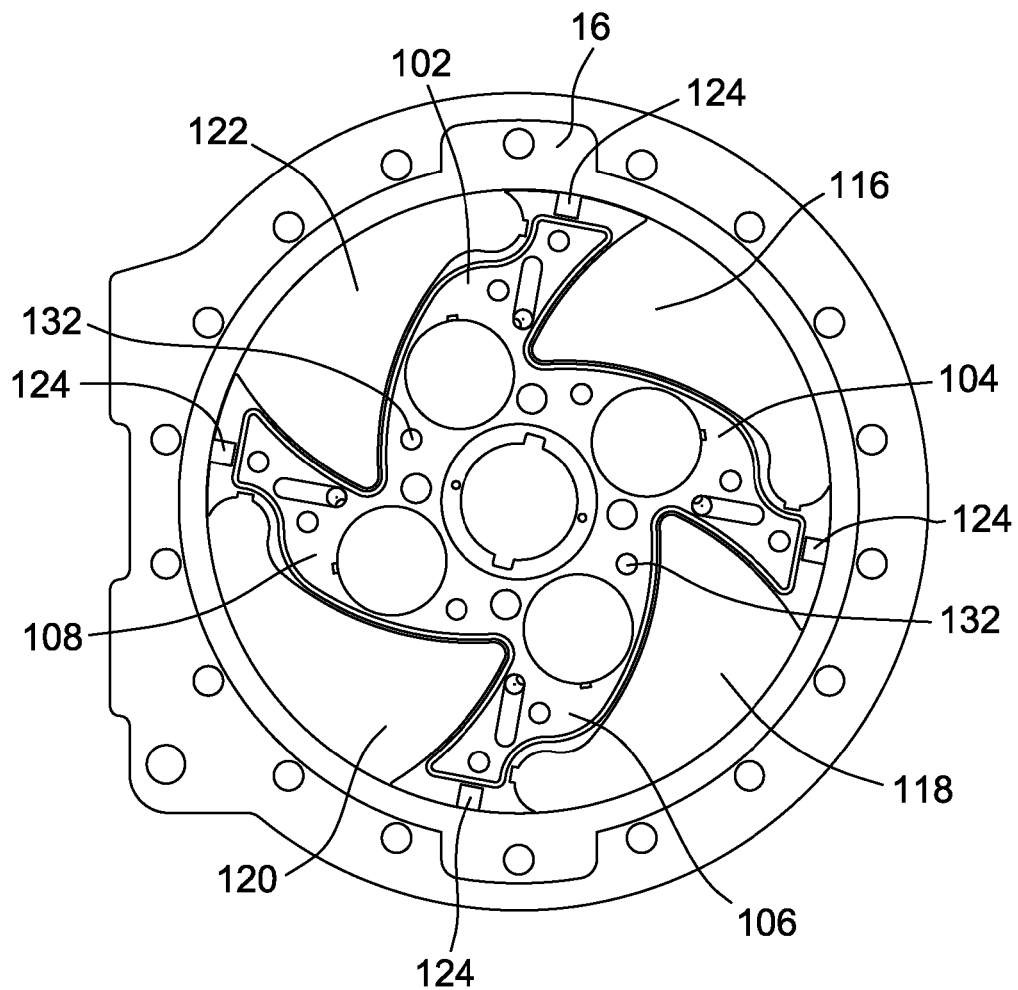

FIG. 3 is a perspective view of a rotor 100 for use with engine 10 shown in FIG. 1, and FIG. 4 is an end view of rotor 100 located in housing 14. In the exemplary embodiment, rotor 100, such as rotor 20, is configured to be used within engine 10 and housing 14. In one embodiment, rotor 100 includes a first arm 102, a second arm 104, a third arm 106, and a fourth arm 108. Located on each arm 102, 104, 106, and 108 is a piston crankshaft aperture 110 for receiving and retaining a keyed bushing with an oiling hole which will receive and retain piston crankshaft assembly of piston assembly 22 (shown in FIGS. 20A-20B). Each arm 102, 104, 106, and 108 also includes a reciprocating channel 112 that enables piston assembly 22 to move in a reciprocating motion within rotor 100. Rotor 100 also includes a main crankshaft aperture 114 configured to receive and retain main crankshaft 12 of engine 10. Apertures 110 each include oil feed channels 115 configured to provide lubrication to the rotating parts within apertures 110 as oil flows from the end plates through the center of the main crank 18 to the rotor 10 via oil feed channels 115. In one embodiment, rotor 100 includes oil feed channels 115 to also lubricate piston pivot pins during operation.

In the exemplary embodiment, compression chambers are created between adjacent arms, ring plates 26, and the inner diameter of housing 14. Alternatively, compression chambers are created between adjacent arms, ring plates 26, and an inner diameter of sleeve 16. For example, a first compression chamber 116 extends between first arm 102 and second arm 104 and to sleeve 16 of housing 14. A second compression chamber 118 extends between second arm 104 and third arm 106 and to sleeve 16 of housing 14. A third compression chamber 120 extends between third arm 106 and fourth arm 108 and to sleeve 16 of housing 14. Additionally, a fourth compression chamber 122 extends between fourth arm 108 and first arm 102 and to sleeve 16 of housing 14. Compression chambers 116, 118, 120, and 122 are configured to compress an air-fuel mixture that will be ignited by an electric spark, plasma, or a high compression causing a combustion. Such combustion forces piston assembly 22 to move, and in effect, rotate rotor 100 within housing 14. Compression chambers 116, 118, 120, and 122 are configured to compress a gas in a compressor application or move a fluid in a pump application. In a compressor or pump application, an electric motor or combustion engine is used to drive main crank shaft 18 which spins rotor 100 and forces piston assemblies 22 to reciprocate to compress a gas or move a fluid.

In the exemplary embodiment, each arm 102, 104, 106, and 108 includes a crossover seal cavity 124 configured to receive and retain a crossover seal 300 (shown in FIG. 7). Seal cavity 124 extends from a first arm extension 126 to a second arm extension 128 of each arm member 102, 104, 106, and 108. In one embodiment, surfaces of first arm extension 126 and second arm extension 128 may have an insert (shown in FIG. 8B) placed on each of extensions 126 and 128 for improved wear and serviceability. In the exemplary embodiment, each arm member 102, 104, 106, and 108 includes a seal spring cavity 130 configured to receive and retain a spring used in combination with crossover seal 300. Rotor 100 also includes a plurality of threaded and unthreaded bores 132. In one embodiment bores 132 are threaded. In one embodiment, bores 132 are unthreaded. In another embodiment, a predetermined number of bores 132 are threaded and a predetermined number of bores 132 are unthreaded. A preconfigured number of threaded bores 132 are configured to couple and/or fasten power module ring plates 26 to rotor 100. Alternatively, a preconfigured number of unthreaded bores 132 are used to drain lubrication away from the rotor 100 during operation.

Figure 5:
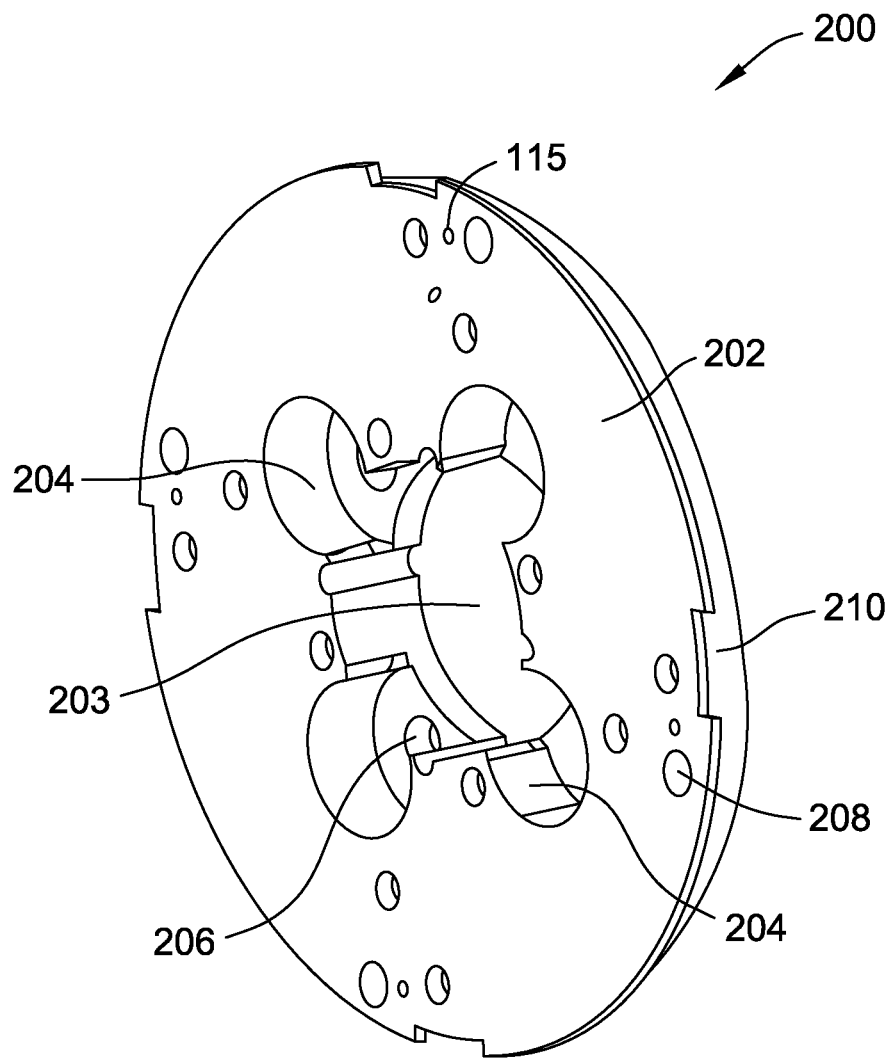
Figure 6B:
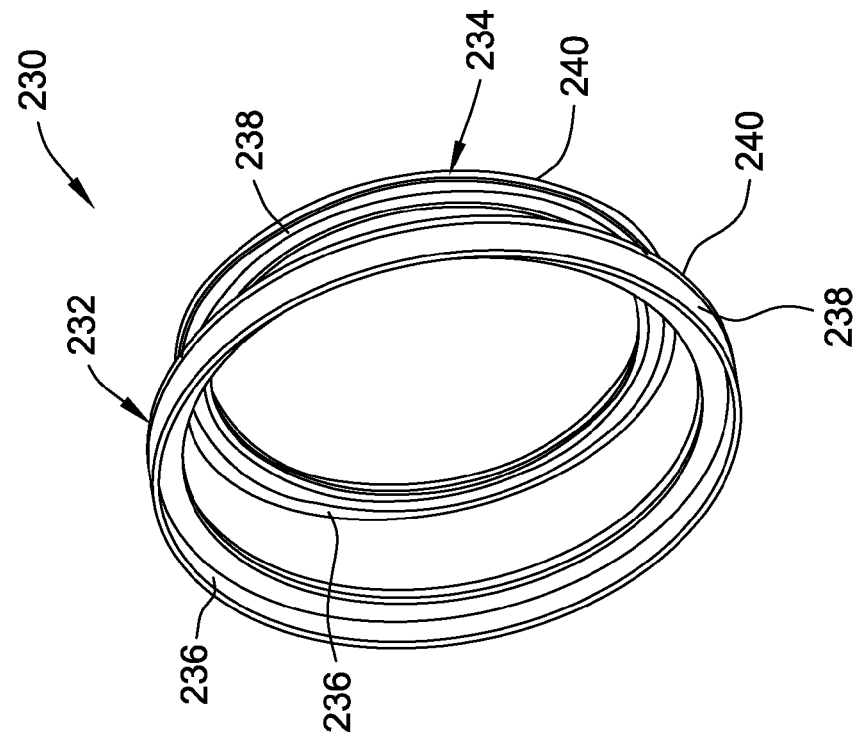
FIG. 6B is a perspective view of a ring seal assembly for use with the ring plate shown in FIG. 6A.
Figure 6A:
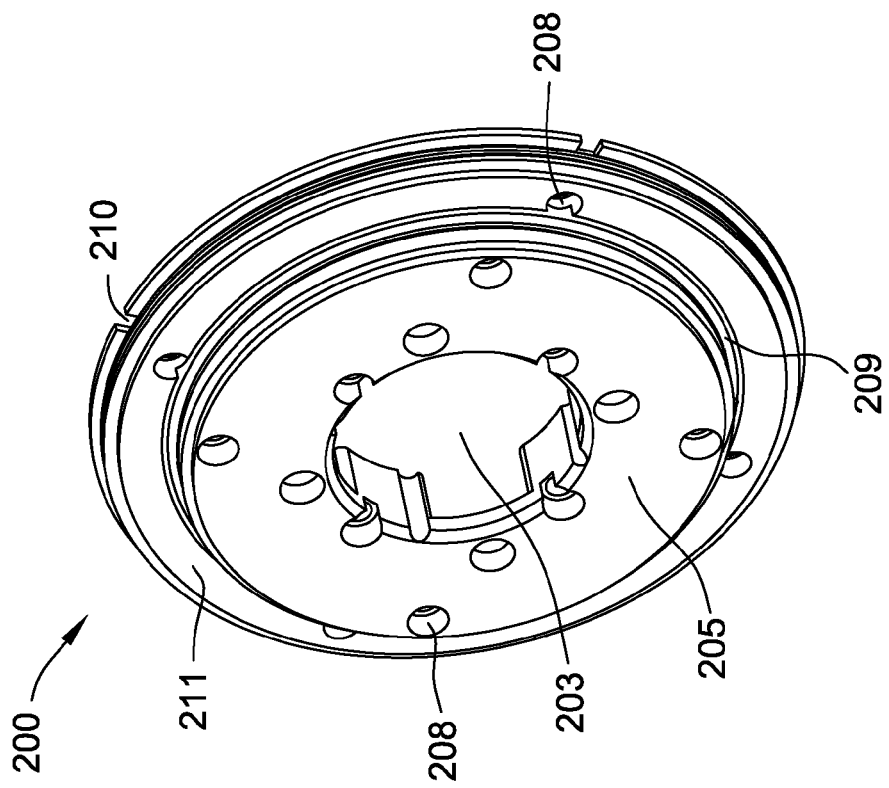
FIG. 6A is an outside perspective view of the ring plate shown in FIG. 2.

FIG. 5 is a back perspective view of ring plate 200, such as power module ring plate 26 shown in FIG. 2, and FIG. 6A is a front perspective view of ring plate 200. FIG. 6B is a perspective view of a ring seal assembly 230 for use with ring plate 200. Engine 10 includes 2 ring plates 200, one on either side of engine 10. Ring plates 200 are positioned on sides of rotor 100. In the exemplary embodiment, ring plate 200 includes an inside face 202 configured to couple to rotor 100. In one embodiment, inside face 202 is configured to remain substantially flush with rotor 100 such that chambers 116, 118, 120, and 122 are substantially sealed by housing 14, rotor arms 102, 104, 106, and 108, and ring plates 200. Rotor 100, together with ring plates 200, encapsulates piston assemblies 22. Ring plates 200 create the inside chamber walls for piston assemblies 22 to seal against.

In the exemplary embodiment, machined into or coupled onto ring plates 200 is a first rotating ring seal mating surface 209 and a second of rotating ring seal mating surface 211. Seal surfaces 209 and 211 act as opposing face seal surface for stationary outer and inner ring seals which extend out from both housing cover plates 806. In an alternate embodiment, rotating outer and inner ring seals extend out from the rotor and contact and seal on stationary mating surfaces on both housing end plates.

Ring seal assembly 230 includes a first ring seal pack 232 and a second ring seal pack 234. Each seal pack 232 and 234 includes a first resilient member 236 abutting a first ring seal 238, a second resilient member (not shown) positioned between first ring seal 238 and a second ring seal 240. Second ring seal 240 mates with an outer surface of ring plate 200. In the exemplary embodiment, second ring seal 240 of first seal pack 232 is configured to mate with mating surface 211 of ring seal 200, and second ring seal 240 of second seal pack 234 is configured to mate with mating surface 209 of ring plate 200. In the exemplary embodiment, resilient member 236 is an O-ring. In one embodiment, the second resilient member is configured to include a channel for receiving oil. Such a channel enables seal assembly to have a compression that is pneumatically and/or hydraulically controlled using a control assembly including, but not limited to, an oil pump. The use of resilient member 236 enables ring seal assembly to function as a compression seal.

Inside face 202 includes a main crankshaft aperture 203 and a plurality of piston crankshaft apertures 204. Piston crankshaft apertures 204 each include a piston crankshaft support recess 206 which is configured to mate with piston crankshaft aperture 110 of rotor 100 (shown in FIG. 4). Aperture 204 and piston crankshaft support recess 206 are configured to receive and the support piston crankshaft assembly of piston assembly 22 that extends from aperture 110. As such, two ring plates 200 can encapsulate or retain all moving parts of engine 10. Similar to bores 132 in rotor 100, ring plate 200 includes a plurality of bores 208 that can be configured to couple plate 200 to rotor 100 and/or drain back lubrication from rotor 100 and/or plate 200 during operation. Ring plate 200 also includes a crossover seal recess 210 for aligning and retaining crossover seal 300 (shown in FIG. 7).

Figures 7A, 7B:
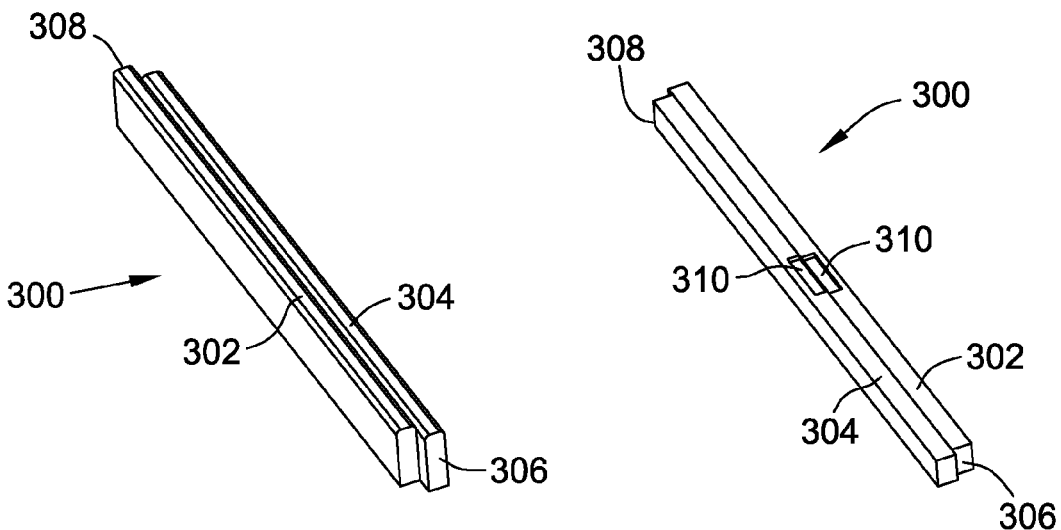
FIG. 7A is a top perspective view of a crossover seal for use with the power module shown in FIG. 2.
FIG. 7B is a bottom perspective view of the crossover seal shown in FIG. 7A.
Figure 7C:
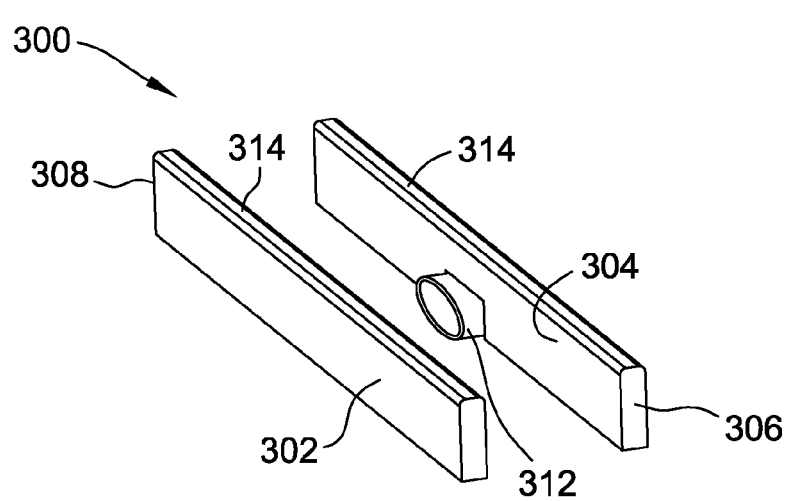
FIG. 7C is an exploded view of the crossover seal shown in FIG. 7A

FIG. 7A is a top perspective view of a crossover seal 300 for use with power module 12 FIG. 7B is a bottom perspective view of crossover seal 300, and FIG. 7C is an exploded view of crossover seal 300. Crossover seal 300 includes a first seal 302 and a second seal 304. Each seal 302 and 304 has a first circumferential edge 306 and a second circumferential edge 308. Edges 306 and 308 are configured to mate with ring seal pack 232 of ring plate 200 to substantially seal combustion chambers 116, 118, 120, and 122. Each seal 302 and 304 includes a recess 310 for retaining a spring 312.

Crossover seal 300 is configured to seat within compression chamber seal cavity 124 (shown in FIGS. 3 and 4) and chamber seal recess 210 (shown in FIGS. 5 and 6). In operation, in the exemplary embodiment, first seal 302 is forced in a first direction and second seal 304 is forced in a second direction opposite the first direction. Spring 312 located in seal spring cavity 130 and recess 310 forces seals away from one another in a lateral direction. In this implementation, as edges 306 and 308 wear and recede, spring 312 forces seals 302 and 304 towards ring seal pack 232 to maintain a constant seal within combustion chambers to maintain a constant pressure. Additionally, a top surface 314 of seals 302 and 304 contacts and seals against the inner diameter of sleeve 16 of housing assembly 14 or directly against the inner diameter of housing assembly 14. As edges 314 wear and recede, spring 312 and centrifugal force seal 302 and 304 towards the sleeve 804 or housing 802 inner diameter to maintain a constant seal and/or pressure within combustion chambers. In the exemplary embodiment, a crossover seal width is larger in arc length than the diameter of the spark plug and/or injector ports in sleeve 16 and/or housing 14 to maintain a constant pressure and avoid leakage through such ports. The sealing by crossover seal 300 creates a sealing force that substantially prevents chamber crossover leak and chamber cross-talk and substantially prevents crankcase pressurization.

In another implementation, a fluid or gas pressurization is maintained in seal spring cavity 130 to force first and second seals 302 and 304 laterally outward opposing each other and radially outward together. Utilizing fluid or gas pressurization enables engine 10 to maintain a regulated constant sealing force or an RPM linked sealing force. A fluid pressurization system also enables a pump oiling system to provide lubrication to crossover seal 300 as well as potentially cool seal 300 from an underside.

Figure 8A:
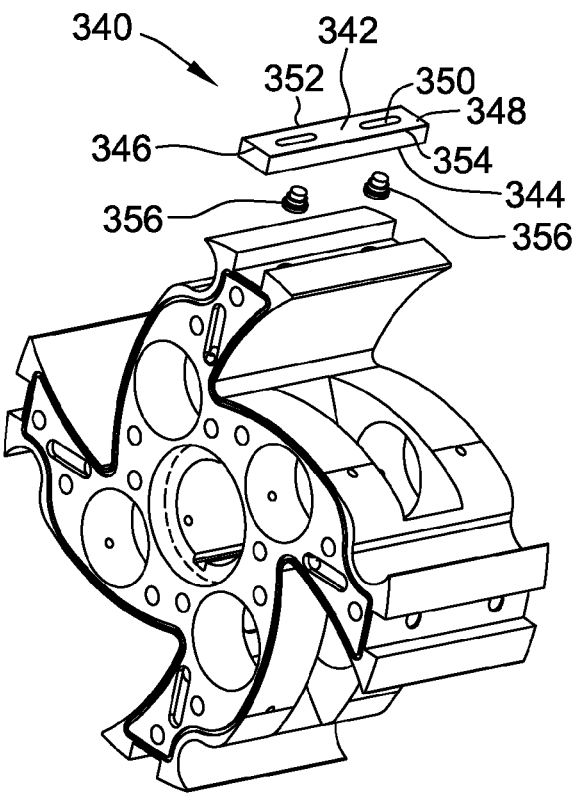
FIG. 8A is a perspective view of an alternative crossover seal for use with the power module shown in FIG. 2.
Figure 8B:
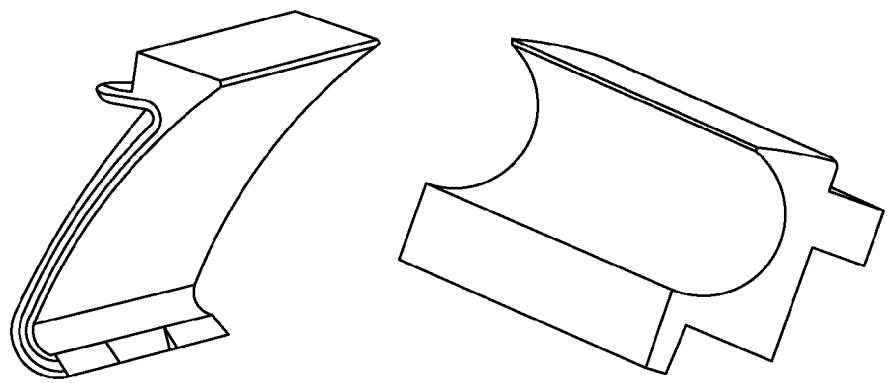
FIG. 8B is a perspective view of inserts for use with the first arm extension and second arm extension shown in FIG. 2.

FIG. 8A is an exploded view of an alternative crossover seal 340 used in rotor 100. Crossover seal 340 is generally flat and includes an outer face 342, an inner face 344, a first lateral edge 346, and a second lateral edge 348. Edge 346 is configured to have a clearance between edge 346 and seal assembly 230 at room temperature. Likewise, Edge 348 is configured to have a clearance between edge 348 and seal assembly 230 at room temperature. The clearance between edges 346, 348, and seal assembly 230 allows seal 340 to expand as it heats during operation to mate and/or seal against seal assembly 230. As outer surface 342 wears and recedes on a crossover seal 340, two or more conical springs 356 and centrifugal force seal 340 towards the sleeve 804 or housing 802 inner diameter to maintain a constant seal and/or pressure within combustion chambers. Outer face 342 may include a plurality of cutouts 350 to minimize rotating friction between crossover seal 340 and sleeve 16 or an inner diameter of housing 14. While four oval cutouts 350 are shown, any number of cutouts having any shape can be used.

Piston Assembly

Figure 9:
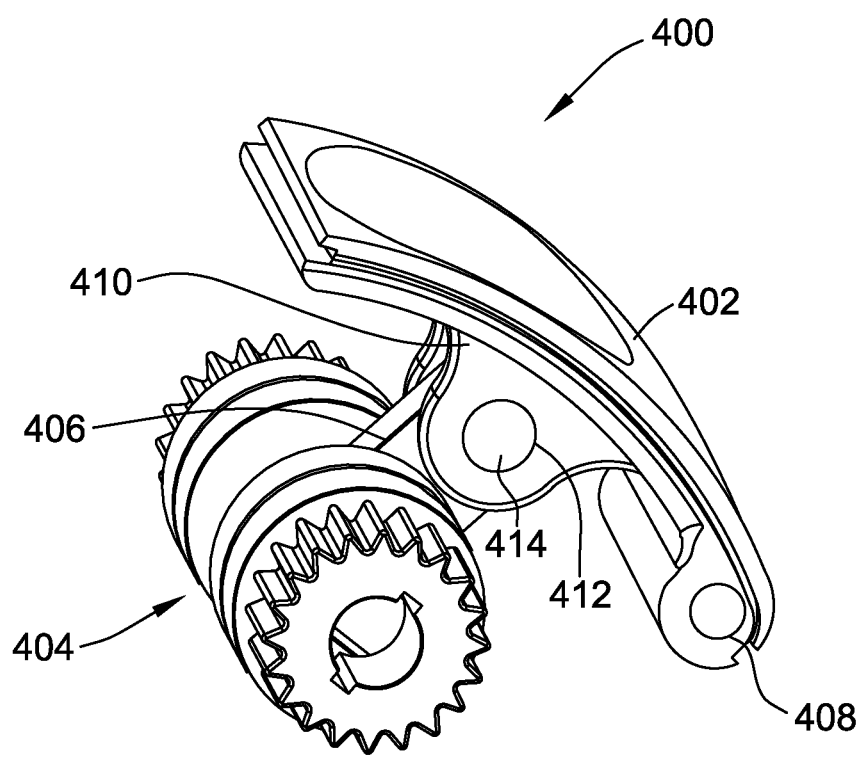

FIG. 9 is a perspective view of a piston assembly 400, such as piston assembly 22 shown in FIG. 2. Piston assembly 400 includes a piston head 402 coupled to a piston crankshaft assembly 404 via a connecting rod 406 with two bushing lined and oiled holes. Piston head 402 includes a pivot connection 408 configured to receive and retain a pivot pin (not shown) that seats within a corresponding bore 208 of inside face 202 of ring plate 200 (shown in FIG. 5). In operation, piston assembly 400 reciprocates about pivot connection 408. Such reciprocation of piston 400 drives and/or rotates piston crankshaft assembly 404 via the reciprocating movement of connecting rod 406.

Piston assembly 400 includes a pivot connection 408 configured to receive and retain a pivot pin (not shown) that seats within a corresponding bore 208 of inside face 202 of ring plate 200. Piston head 402 also includes a connecting rod boss 410 configured to receive connecting rod 406. Boss 410 includes a rod pin bore 412 configured to receive and retain a piston head pin 414 that couples piston head 402 to connecting rod 406.

Figure 10:
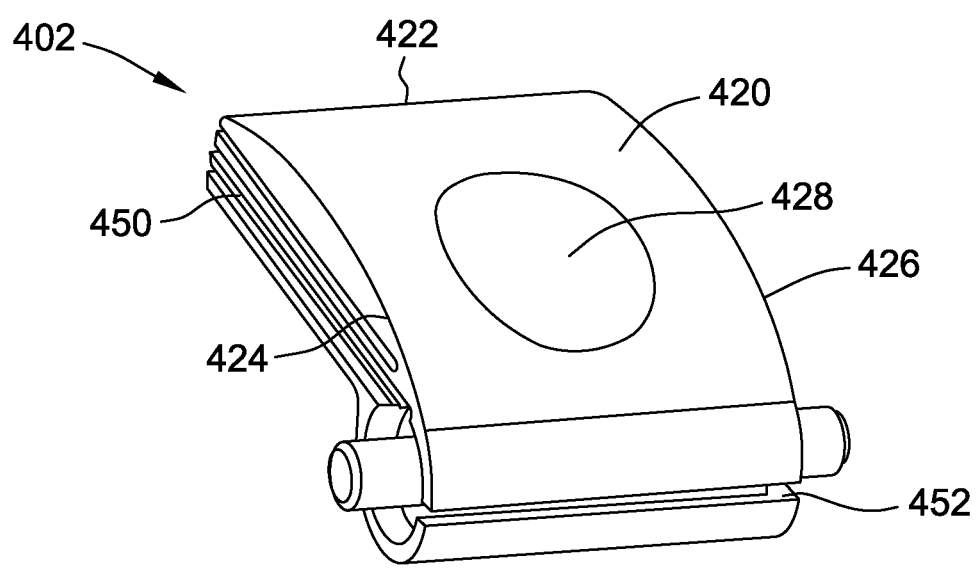

FIG. 10 is a perspective view of an exemplary piston head 402. In the exemplary embodiment, piston head 402 includes an outer surface 420 having a front edge 422, a first lateral edge 424, and a second lateral edge 426. In one embodiment, outer surface 420 is curved and includes a combustion recess 428 that is configured to provide a combustion zone. Outer surface 420 is fabricated to have a shape that is complimentary to sleeve 16 such that outer surface 420 substantially mates with sleeve 16 or an inner diameter of housing 14 shown in FIG. 2 when piston head 402 is fully extended. As piston head 402 extends towards sleeve 16, intake within the combustion chamber is forced into recess 428 from surface 420. The combustion zone created by recess 428 enables an electrical ignition (e.g., spark plug, plasma plug) to provide a spark that creates a combustion, which forces piston head 402 away from sleeve 16 rotating crankshaft assembly 404. In the exemplary embodiment, recess 428 is substantially oval, however, recess 428 can have any shape, size, and location that facilitates providing a combustion zone as described herein. Varying dimensions of recess 428 enables a combustion zone to be created that achieves a predetermined compression based on the requirements of engine 10. Shape variations of recess 428 enables engine 10 to produce unique combustions. Placement of recess 428 provides alignment with one or more ignition device spark or plasma initiation zones.

Figure 11A:
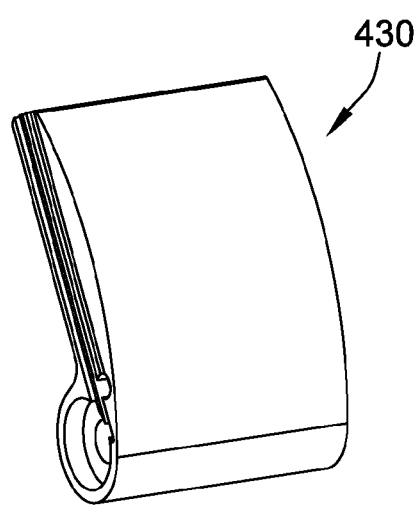
FIGS. 11A-11D are perspective views of alternative outer surfaces for use with the piston head shown in FIG. 10.
Figure 11B:
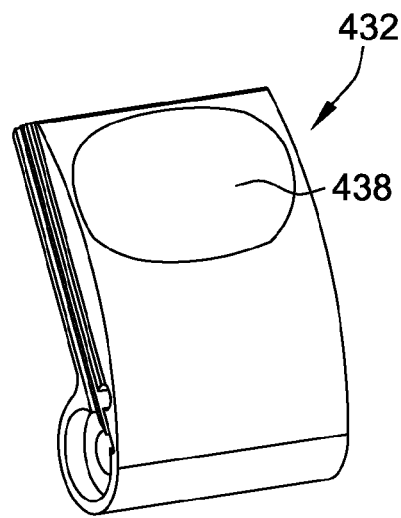
Figure 11C:
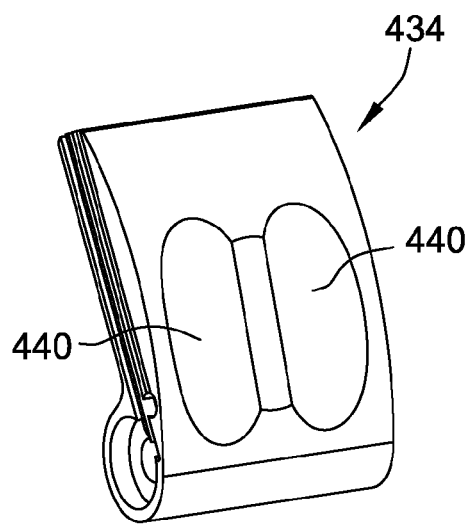
Figure 11D:
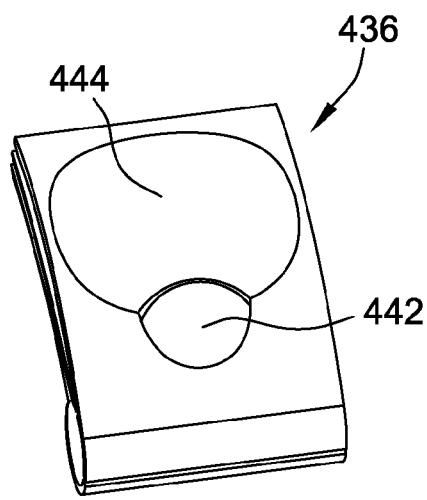

FIGS. 11A-11D are perspective views of alternative outer surfaces 430, 432, 434, and 436 for use with piston head 402 shown in FIG. 10. Outer surface 430 of FIG. 11A is substantially smooth and includes no recess such that all of outer surface 430 is a combustion zone. A surface without a recess can provide engine 10 with a maximum pressure for combustions. Outer surface 432 of FIG. 11B includes a recess 438 situated near front edge 422 for an enhanced and/or increased torque. Outer surface 434 of FIG. 11C is configured to coordinate with a two ignition device system. Outer surface 434 includes two substantially similar recesses 440 that create two combustion zones, one combustion zone for each ignition device. FIG. 11D provides a dual combustion zone system for use with one ignition device. Outer surface 436 includes a first recess 442 and a second recess 444. First and second recesses 442 and 444 are configured to enable two different combustions to occur using a single ignition device.

Referring back to FIG. 10, piston head 402 includes a front piston sealing channel 450 and a rear piston sealing channel 452. Each channel 450 and 452 is configured to receive and retain piston seals. In the exemplary embodiment, piston seals (not shown) are positioned in sealing channels 450 and 452 such that a constant seal and/or pressure is maintained within combustion chambers. Seals within channels 450 and 452 are coupled together by a pivot sleeve (not shown) seated in pivot connection 408. In an assembled manner, a portion of seals within channel 450 extending from first and second lateral edges 424 and 426 abuts and/or mates with inside face 202 of ring plate 200, and a portion of seals within channel 450 extending from front edge 422 abuts and/or mates with a preceding rotor arm. Similarly, a portion of seals within channel 452 extending from pivot connection 408 abuts and/or mates with first extension 126 of the rotor arm in which piston assembly 400 is seated. For example, piston assembly 400 seated in second rotor arm 104 will have a portion of seals extending from front edge 422 seal against first arm 102 and a portion of seals extending from pivot connection 408 seal against first extension 126 of second arm 104.

Figure 12A:
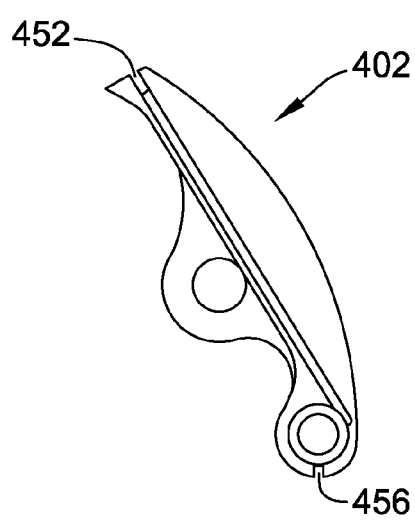
FIGS. 12A-12D are side views of piston sealing channels that can be used with the piston head shown in FIG. 10.
Figure 12B:
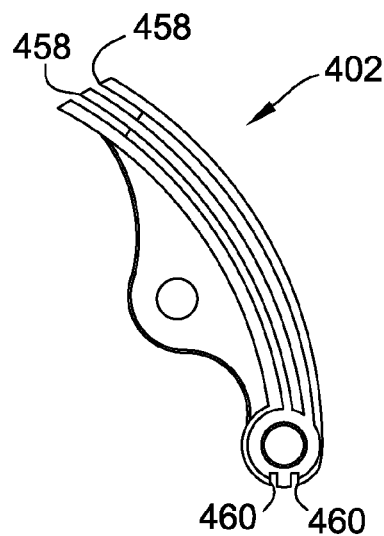
Figure 12C:
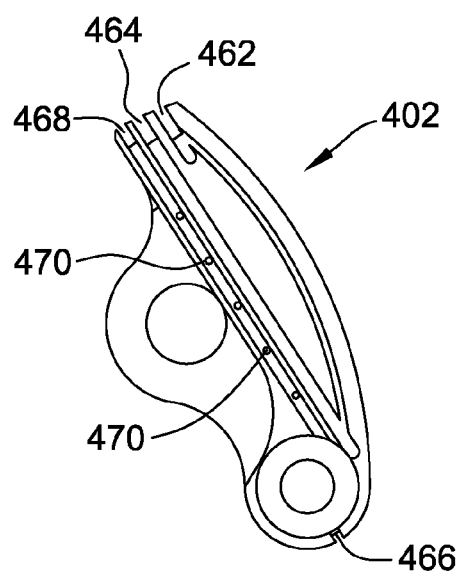

FIGS. 12A-12D are side views of piston sealing channels that can be used with piston head 402. Front channel 452 and rear channel 456 of FIG. 12A is configured to receive and retain seals that are substantially flat. Front channels 458 of piston head 402 shown in FIG. 12B are configured to receive and retain seals that are substantially curved while rear channels 460 receive and retain seals that are substantially flat. The use of two or more sealing channels, such as channels 458 and 460 enables piston head 402 to create a redundant seal. Piston head 402 shown in FIG. 12C includes a curved front channel 462 for receiving and retaining curved seals and a straight front channel 464 and rear channel 466 for receiving and retaining substantially flat seals. Piston head 402 shown in FIG. 12C also includes a skirt 468 that, in addition to receiving and retaining seals, includes lubricant angled drain holes 470, which extend to an underside of piston head 402. Channels 462 and 464 enable piston head 402 to create different compressions of the seals based on the connectivity of the channels. Additionally, channels 462 and 464 enable piston head 402 to receive multiple curved or flat seals with or without cylindrical seal couplings.

Figure 12D:
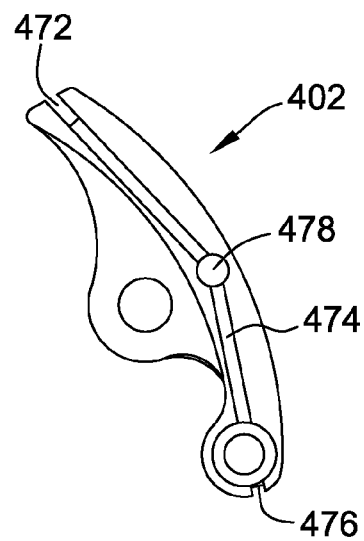

Piston head 402 of FIG. 12D includes a front seal channel 472, a middle seal channel 474, and a rear seal channel 476 that are all configured to receive and retain substantially flat seals. Front channel 472 and middle channel 474 are connected by a connection sleeve recess 478 that is sized to accept a connection sleeve (not shown) that couples and seals the link between seals within channels 472 and 474 in a similar fashion to the pivot sleeve. While connection sleeve recess 478 is shown to have a substantially circular shape, connection sleeve recess 478 can have any shape that facilitates sealing as described herein and shown in FIGS. 13A-13E. Similarly, while pivot connection 408 is shown to have a substantially circular shape, pivot connection 408 can have any shape that facilitates sealing such as a teardrop shape shown in FIG. 13F. It should be noted that any number of sealing channels having any combination of designs can be used herein to maintain pressure and/or sealing within a combustion chamber.

Piston Seals

Figure 14A:
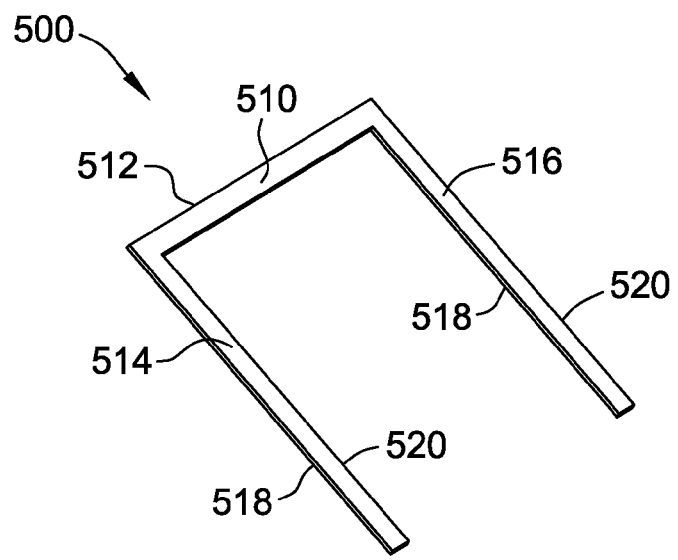
FIGS. 14A-14F are perspective views of exemplary seals that can be used with the piston head shown in FIG. 10.
Figure 14B:
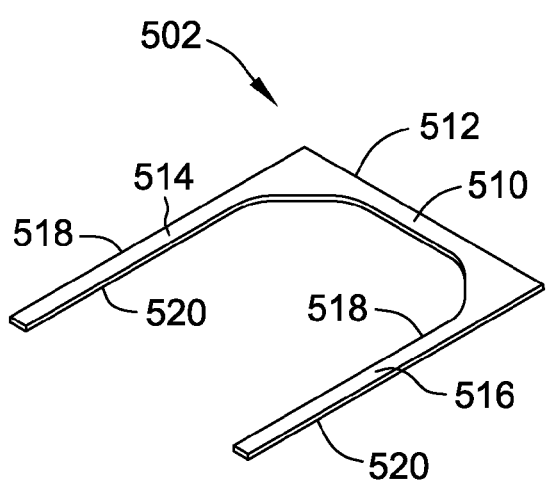
Figure 14C:
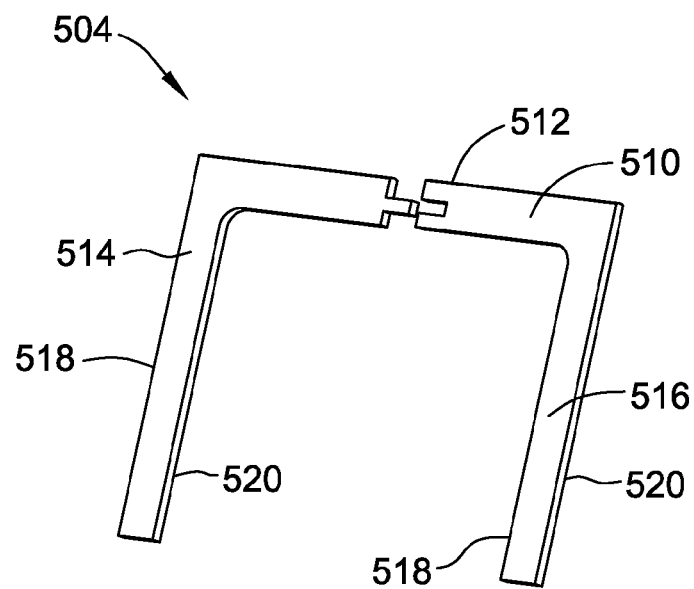
Figure 14D:
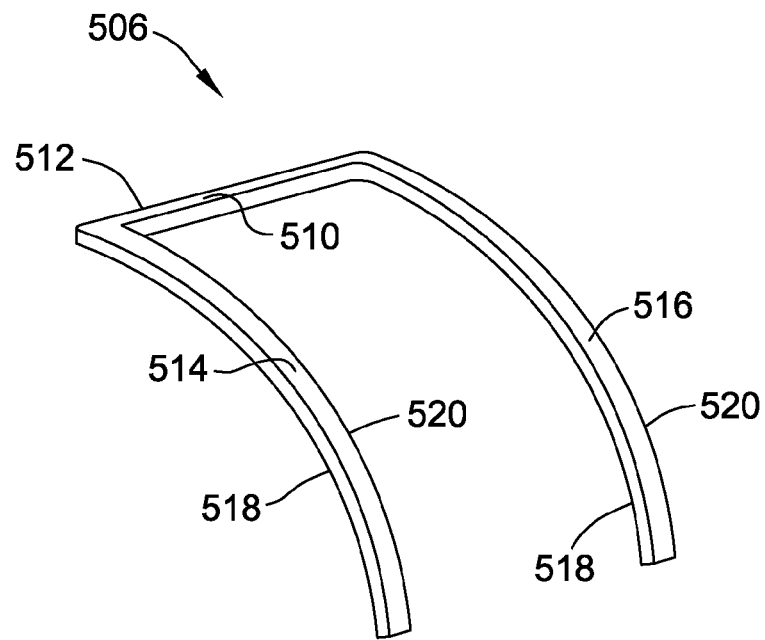
Figure 14E:
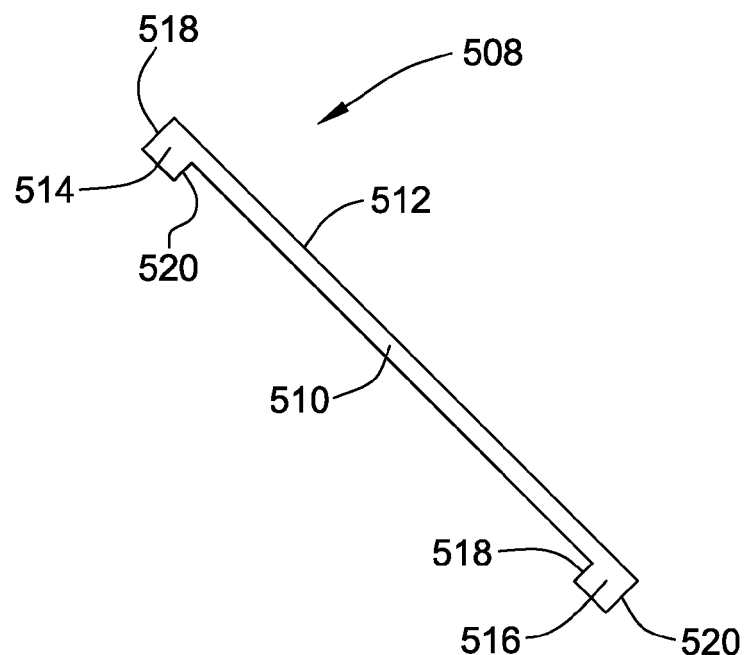
Figure 14F:
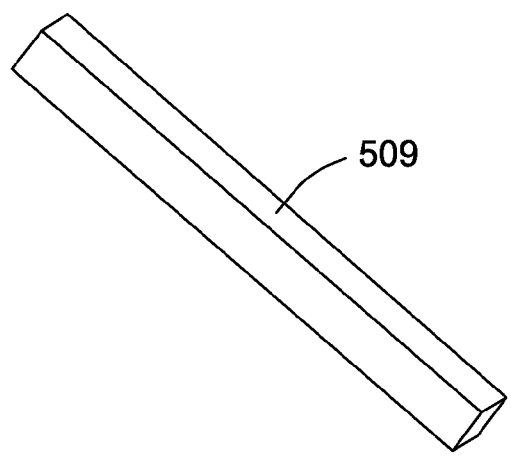

FIGS. 14A-14F are perspective views of exemplary seals 500, 502, 504, 506, 508, and 509 that can be used with piston head 402. Seal 500 of FIG. 14A, seal 502 of FIG. 14B, and seal 504 of FIG. 14C are each substantially flat seals that are configured to seal within substantially flat front piston channels, such as channel 454 shown in FIG. 12A. Seal 506 of FIG. 14D is curved and configured to seal within curved front piston channels, such as channel 458 of FIG. 12B. Seal 508 of FIG. 14E is substantially flat and configured to seal within rear piston channels, such as channel 456 shown in FIG. 12A. Seal 509 of FIG. 14F is a substantially solid seal that may be used to seal within middle piston channels, such as channel 474 shown in FIG. 12D. In the exemplary embodiment, seals 500, 502, 504, 506, 508, and 509 are metal, however, seals 500, 502, 504, 506, 508, and 509 can be any material that facilitates sealing as described herein including, but not limited to, an elastomeric material. Each of seals 500, 502, 504, 506, and 508 includes a base 510 having a front edge 512. Extending from base 510 are a first leg 514 and a second leg 516. First leg 514 and second leg 516 each include an outer edge 518 and 520 respectively. Such a configuration enables seals 500, 502, 504, 506, and 508 to be fabricated in close proximity to piston head channels such that seals 500, 502, 504, 506, and 508 slide into and/or out of channels in piston head 402. Base 510 and leg 514 and 516 upper and lower faces seal against the piston upper and lower channel surfaces. Edge 512 seals against the rotor 100 surface 128 or 126. Edges 518 and 520 seal against the back ring plate 200 surface 202 and also act as a seating surface for springs to extend the seals.

In one embodiment, front edge 512 and outer edges 518 and 520 are fabricated and/or finished to include a predetermined shaped edge. Shaped edges can be selected to achieve a desired wear, sealing, and/or vibrational characteristic for the seals. In one embodiment, front edge 512 is shaped to interface and/or seal against arms of rotor 100, and outer edges 518 and 520 are shaped to interface and/or seal against ring plate 200. In another embodiment, a flexible seal (not shown) is placed around seals 500, 502, 504, 506, and 508 in an O-ring configuration. The flexible seal can have any cross-sectional shape including, but not limited to square and circular. In the exemplary embodiment, seals 500, 502, 504, 506, and 508 are configured to be used in pairs as a sealing assembly. Seals 500, 502, 504, 506, and 508 may be fabricated to be individually unique to match a respective sealing channel.

Figure 15A:
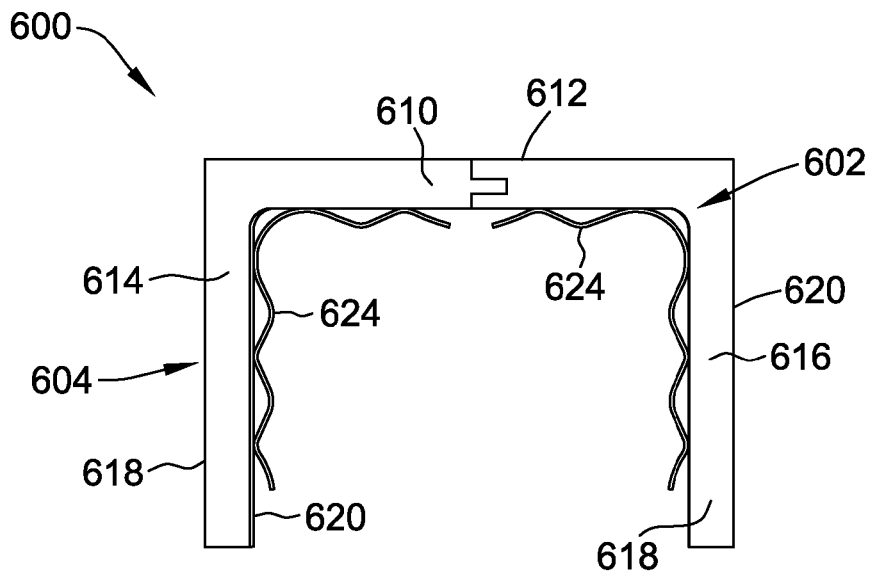
FIG. 15A is a top view of a sealing assembly for use with piston head shown in FIG. 10.
Figure 15B:
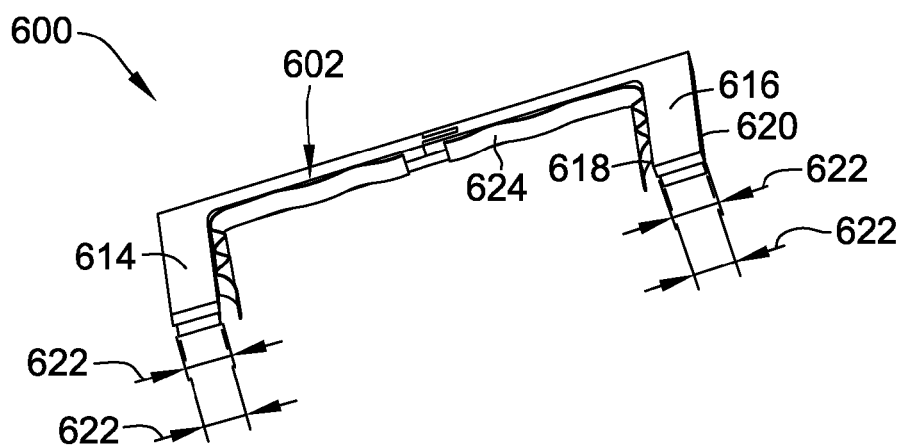
FIG. 15B is a perspective view of the sealing assembly shown in FIG. 15A.

FIG. 15A is a top view of sealing assembly 600 for use with piston head 402 shown in FIG. 10, and FIG. 15B is a perspective view of sealing assembly 600. In the exemplary embodiment, sealing assembly 600 includes a first seal 602 and a second seal 604, such as seals 500, 502, 504, 506, and 508 shown in FIGS. 14A-14F. Each seal 602 and 604 includes a base 610 having a front edge 612 with a first leg 614 and a second leg 616 extending from base 610. Legs 614 and 616 each have an outer edge 618, an inner edge 620, and a width 622 extending between edges 618 and 620. Sealing assembly 600 also includes two spring members 624. When assembled, spring members are positioned between channels in piston head 402 and inner edges 620. Spring members 624 are configured to urge edges 612, 618, and 620 from sealing channels towards a sealing surface (e.g., ring plate inside face and/or rotor arm). In the exemplary embodiment, spring members 624 are wave springs. In one embodiment, spring members 624 are coil springs placed into pockets at the base of the channels. In a compressor or pump application embodiment, spring members 624 are an O-ring type of seal having any cross-sectional shape. Alternatively, spring members 624 can be any apparatus that urges seals 602 and 604 from sealing channels towards a sealing surface.

In the exemplary embodiment, first seal 602 is a two-piece flat seal such as seal 504 and second seal 604 is a single piece flat seal such as seal 500. In this embodiment, width 622 of first and second legs 614 and 616 of first seal 602 is wider than width 622 of first and second legs 614 and 616 of second seal 604. In this embodiment, spring members 624 only urge first seal 602 towards ring plate 200 sealing surfaces as first seal separates laterally. In this embodiment, spring members 624 urge both the first seal 602 and the second seal 604 front or back towards rotor 100 sealing surfaces. Sealing assembly 600 enables a constant pressure to be maintained inside of a combustion chamber at startup (e.g., when seals are cold) and during operation (e.g., when seals have expanded due to internal temperatures) by allowing seals to move in a reciprocating manner. Assembly 600 also enables seals 602 and 604 to maintain a constant pressure as edges 612 and 618 recede due to wear and/or use.

Figure 15C:
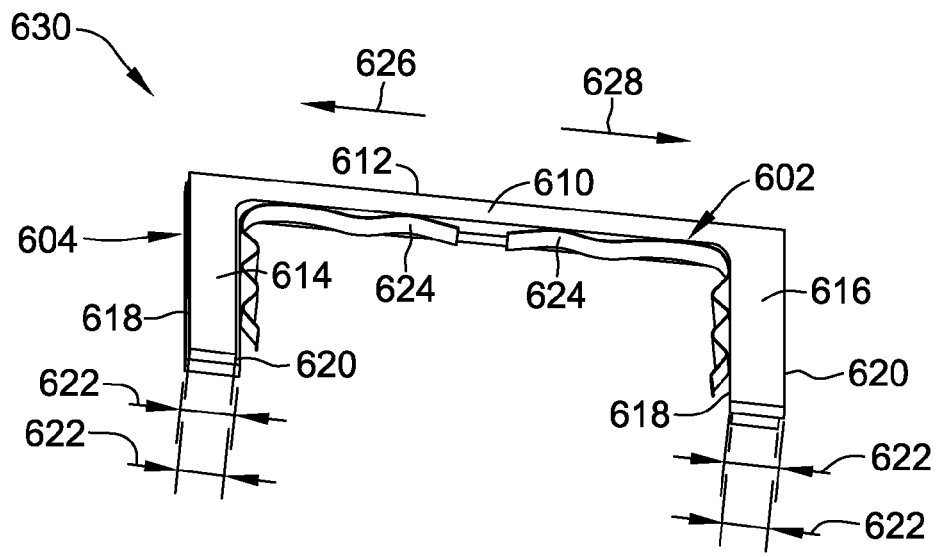
FIG. 15C is a perspective view of an alternative sealing assembly for use with the piston head shown in FIG. 10.

FIG. 15C is a perspective view of an alternative sealing assembly 630 for use with piston head 402 shown in FIG. 10. Sealing assembly 630 is substantially similar to sealing assembly 600 (shown in FIGS. 15A and 15B), except first seal 602 is a single flat seal substantially similar to seal 604. As such, components shown in FIG. 15C are labeled with the same reference numbers used in FIGS. 15A and 15B. In the exemplary embodiment, width 622 of first leg 614 of first seal 602 differs from width 622 of first leg 614 of second seal 604. Likewise, width 622 of second leg 616 of first seal 602 differs from width 622 of second leg 616 of second seal 604. In this embodiment, width 622 of first leg 614 of first seal 602 is smaller than width 622 of first leg 614 of second seal 604, and width 622 of second leg 616 of first seal 602 is larger than width 622 of second leg 616 of second seal 604. Such a configuration enables spring member 624 to urge second seal 604 in a first direction 626 and to urge first seal 602 in a second direction 628 opposite first direction 626 when pushed from the base of a sealing channel in pivot head 402.

Figure 15D:
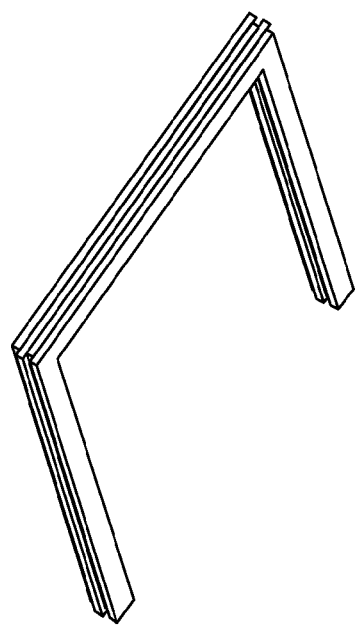
FIG. 15D is a perspective view of an alternate sealing assembly for use with piston head shown in FIG. 10.

While the exemplary embodiments of sealing assemblies 600 and 630 are illustrated with two seals 602 and 604, it should be noted that sealing assemblies 600 and 630 can include any number of seals, including 4 as shown in FIG. 15D. The seals in assemblies 600 and 603 can have variable thicknesses and variable size differences within assemblies 600 and 603. Assemblies 600 and 603 can be stacked together to create assembly packs (e.g., FIG. 15D). Similarly, multiple assemblies 600 and 603 and/or assembly packs can be used within a single sealing channel 450 and 452 or multiple channels like 450 and 452 within a single piston 100.

Figure 16:
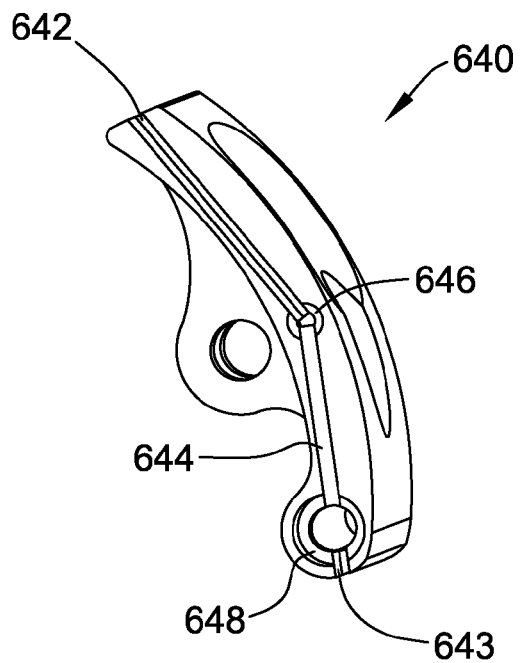
Figure 17:
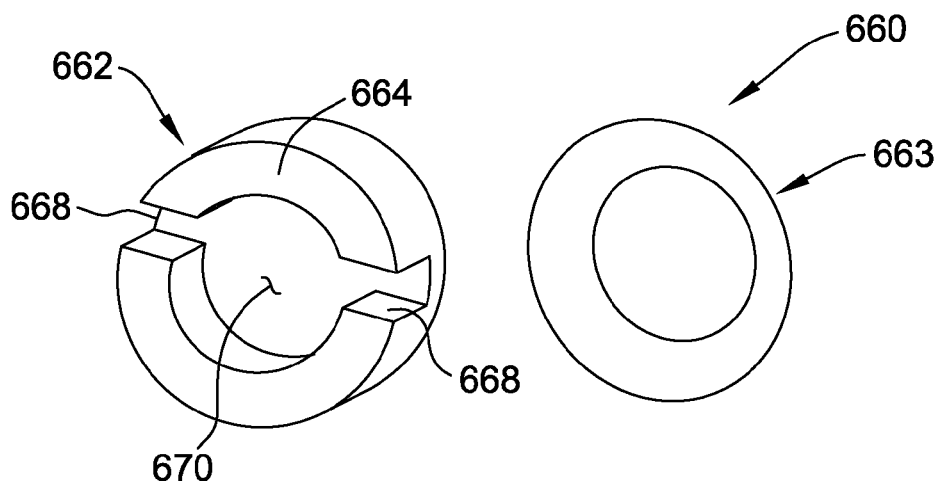

FIG. 16 is a perspective view of a partially assembled piston head 640, such as piston head 402 shown in FIG. 12D. FIG. 17 is a perspective view of an exemplary piston sleeve 660 for use with piston head 640 (shown in FIG. 16). Piston head 640 includes sealing assemblies 642 and 643, such as sealing assemblies 600 and 630 (shown in FIGS. 15B and 15C) that are positioned within sealing channels, such as channels 472 and 476. Piston head 640 also includes a middle seal 644, such as seal 509 shown in FIG. 14F. Piston head 640 includes a piston sleeve recess 646 and a pivot sleeve recess 648. Piston sleeve 660 can be any sleeve for use with piston head 640 such as piston sleeves fabricated to position within piston sleeve recess 646 and pivot sleeve recess 648.

Figure 18:
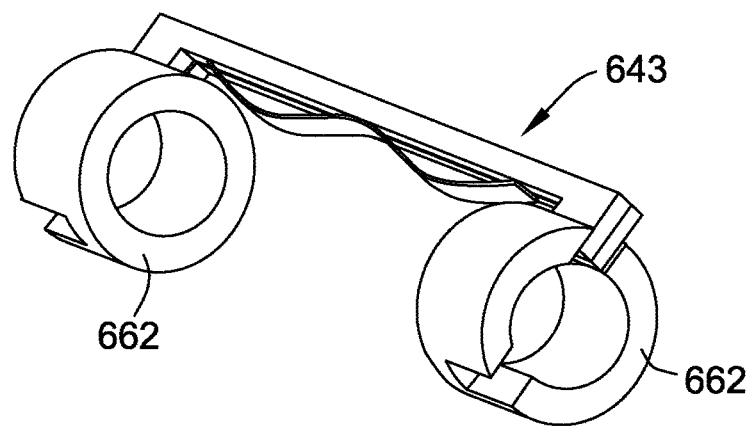

Piston sleeve 660 includes a sleeve 662 and a spring member 663. Sleeve 662 includes an outer surface 664, an inner surface 666, and two seal apertures 668 for receiving and retaining piston seals and/or piston seal assemblies. In the exemplary embodiment, outer surface 664 is configured to mate and/or seal against inside face 202 of ring plate 200 (shown in FIG. 5). In one embodiment, sleeve 662 also includes a pivot pin aperture 670 sized to enable a pivot pin (not shown) extending from pivot connection 408 and recess 648 to pass through. Alternatively, sleeve 662 does not include a pivot pin aperture such as a sleeve for use in sleeve recess 646. In one embodiment, sleeve 662 is sized to seat in piston pivot recess 648 and is configured to receive and retain at least a portion of seal assembly 643 and middle seal 644. In another embodiment, pivot sleeve 662 has its pivot pin inner diameter hole removed and is sized to become a piston sleeve then is seated in piston sleeve recess 646 and is configured to receive and retain at least a portion of seal assembly 642 and middle seal 644. In the exemplary embodiment, spring member 663 is configured to urge sleeve 662 away from piston head 640 towards a sealing surface (e.g., ring plate 200). In one embodiment, spring member 663 is a Belleville washer. Alternatively, spring member 663 can be any mechanism that enables either the piston or pivot sleeve to seal a combustion chamber as described herein. FIG. 18 is a perspective view of a sleeve 662 pair and sealing assembly 643 for use in piston head 640 (shown in FIG. 16).

FIGS. 19A-19E are bottom perspective views of alternative piston pivot coupling assemblies 700, 702, 704, 706, and 708 for use with piston assembly 400. It should be noted that piston head 402 includes at least one lubricant pooling area 710 on an underside of piston head 402 as can be seen by FIGS. 19A-19E. Pooling area 710 enables any chamber of the power module, which is pointing downward after rotation stops, to drain lubrication collected during rotation rather than having it pool in the piston seal areas.

Figure 19A:
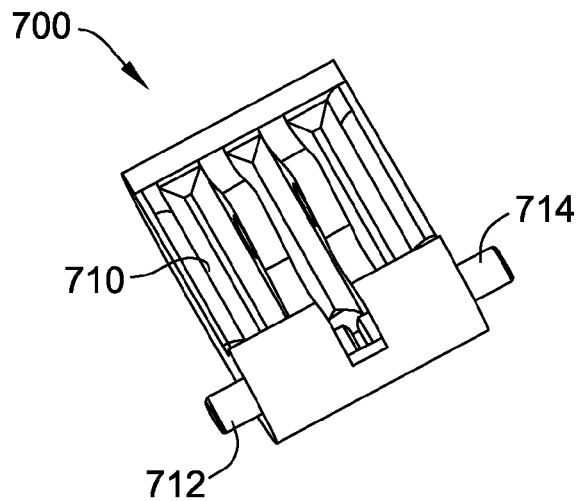
FIGS. 19A-19E are bottom perspective views of alternative pivot coupling assemblies for use with the piston assembly shown in FIG. 9.
Figure 19B:
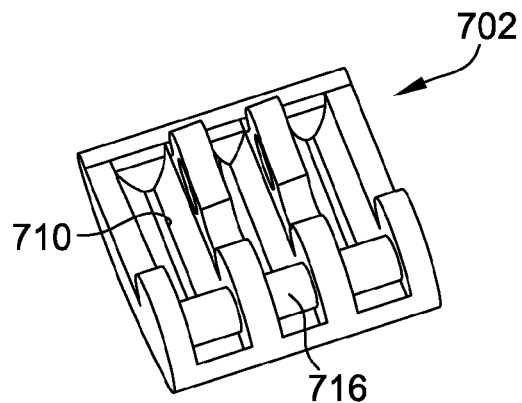
Figure 19C:
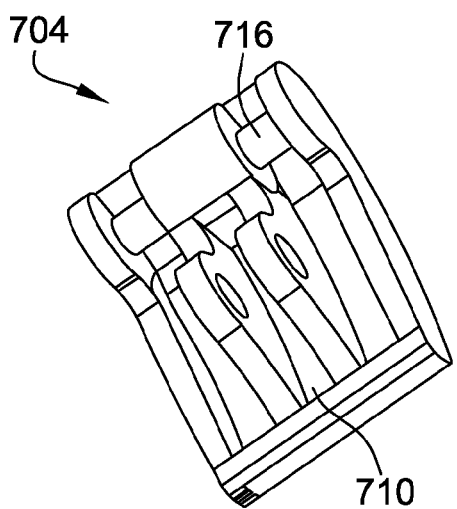

Piston coupling assembly 700 of FIG. 19A includes a first pivot pin 712 extending in a first lateral direction from assembly 700 and a second pivot pin 714 extending in a second lateral direction from assembly 700. Each pivot pin 712 and 714 is configured to seat within a corresponding bore 208 of inside face 202 of ring plate 200 to couple assembly 700 to power module 12. Piston coupling assemblies 702 and 704 each include a center section pivot pin 716 such that pin 716 does not extend out laterally from the coupling assembly and is pressed in flush from one side. In this embodiment, a piston coupling mechanism is used to couple piston assemblies 702 and 704 to a rotor arm rather than to the ring plates 200.

Figure 19D:
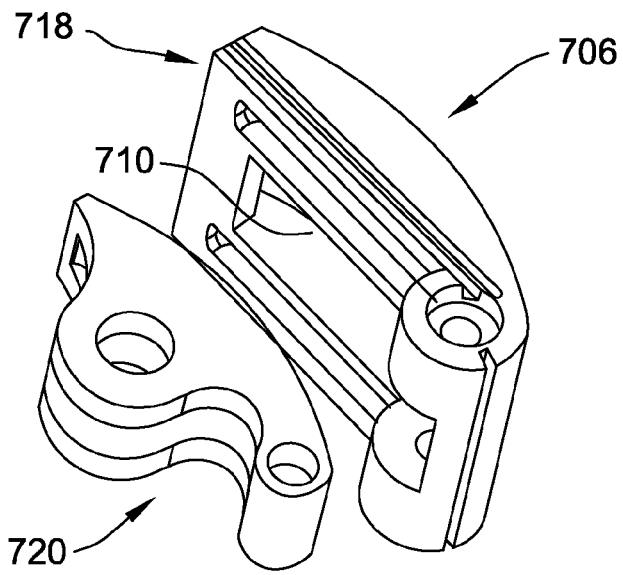
Figure 19E:
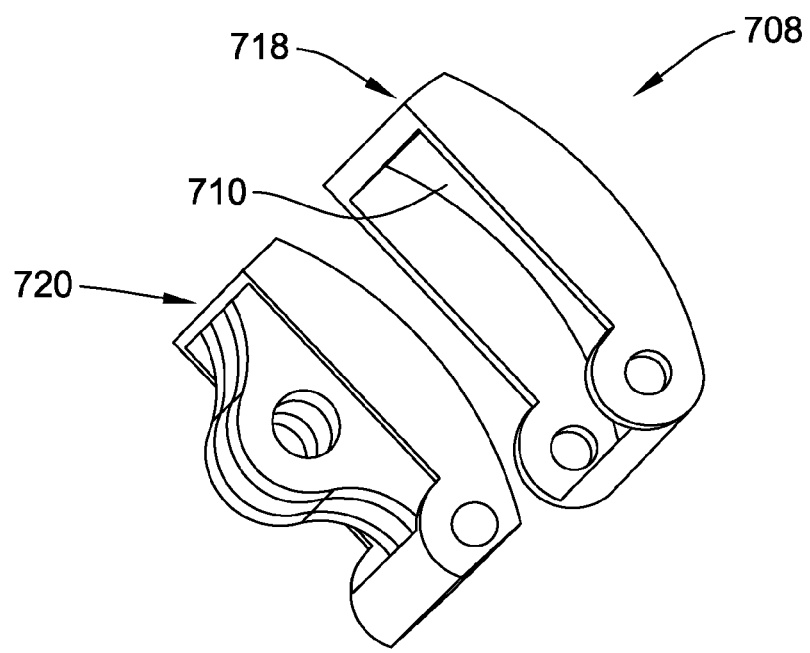

Coupling assemblies 706 and 708 of FIGS. 19D and 19E each include a topside 718 piston head and a bottomside 720 piston base. Topside 719 and bottomside 720 are coupled together with a pivot pin (not shown) after sliding the bottomside 720 front edge into a receiving groove in the topside 719 front. Similar to assembly 700, the pivot pin is configured to seat within corresponding bores 208 of inside face 202 of ring plates 200 to couple assembly 700 into power module 12. Assemblies 706 and 708 simplify seal installation, reduce seal leakage, and improve seal groove machining efficiency.

Figure 20A:
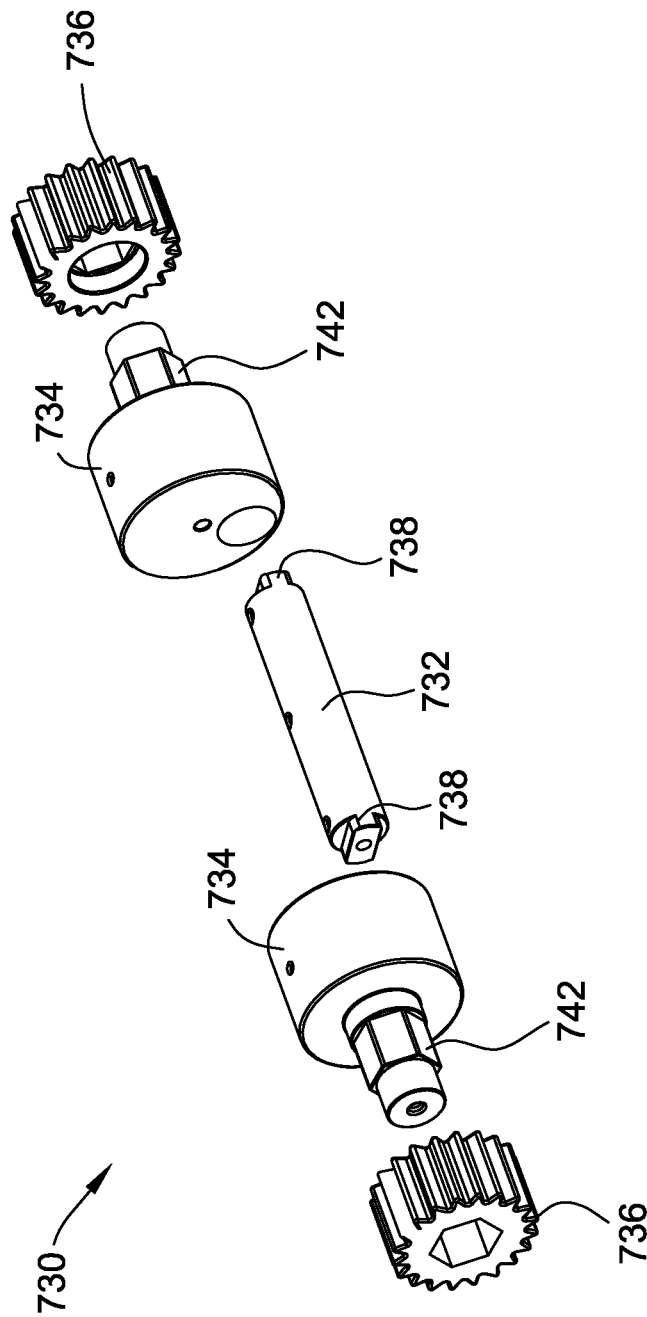
FIG. 20A is an exploded view of an exemplary piston crankshaft assembly, such as the crankshaft assembly shown in FIG. 9.
Figure 20B:
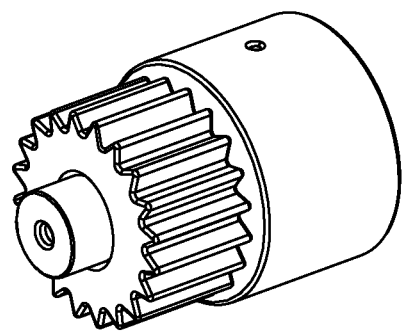
FIG. 20B is a perspective view of an alternative journal for use with the crankshaft assembly shown in FIG. 9
Figure 20C:
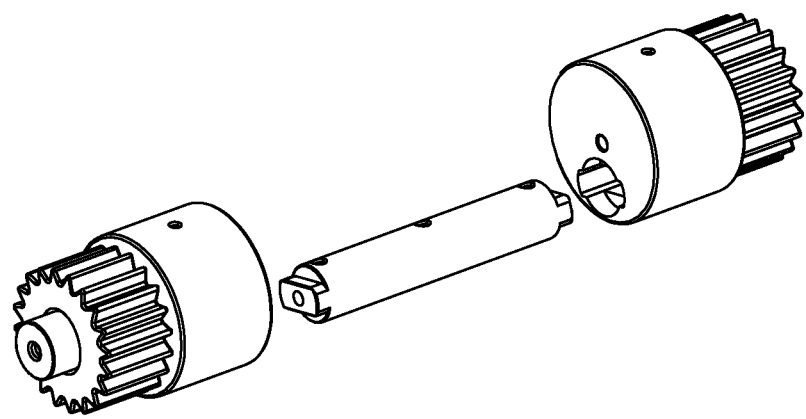
FIG. 20C is an exploded view of an alternative piston crankshaft assembly, such as the crankshaft assembly shown in FIG. 9.
Figure 21A:
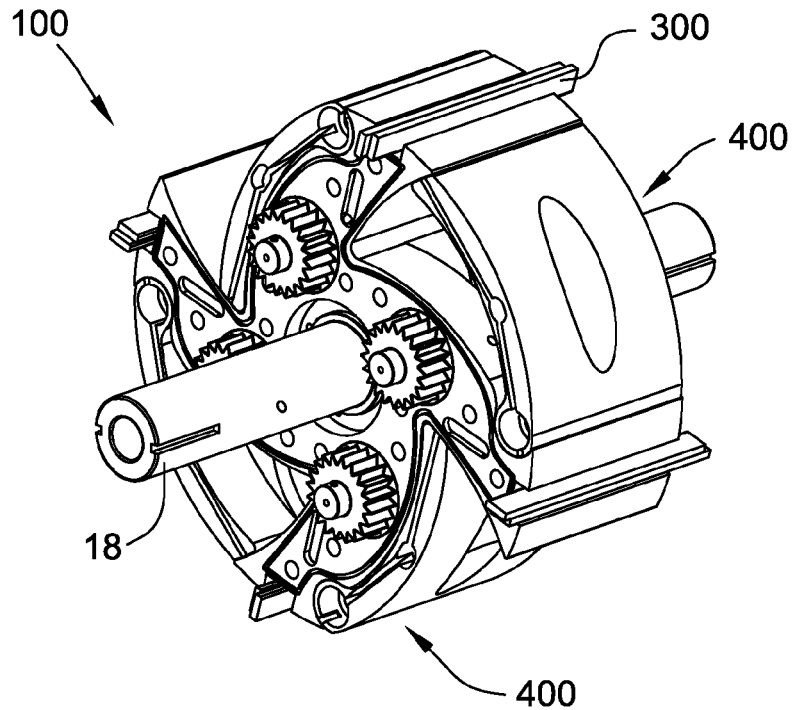
FIG. 21A is a perspective view of rotor shown in FIG. 3 with the main crankshaft, the crossover seals, and the piston assembly positioned therein.
Figure 21B:
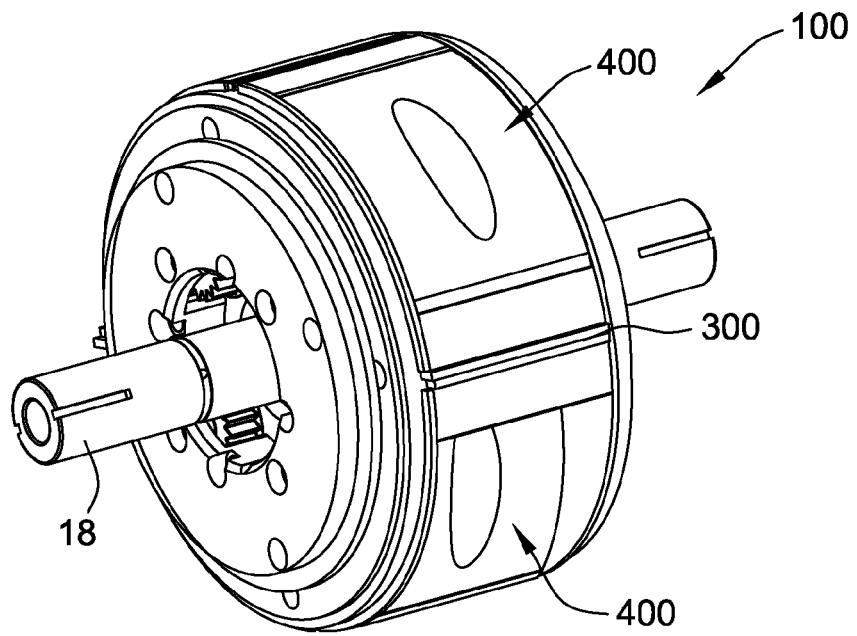
FIG. 21B is a perspective view of the power module shown in FIG. 3 with the main crankshaft, the crossover seals, and the piston assembly positioned therein.

Referring again to FIG. 9, piston assembly 400 includes piston crankshaft assembly 404 that is configured to rotate as a result of the reciprocating motion of piston head 402 and connecting rod 406. FIG. 20A is an exploded view of an exemplary piston crankshaft assembly 730, such as crankshaft assembly 404. Assembly 730 includes a piston shaft 732, two piston crankshaft journals 734, and two spur gears 736. In one embodiment, shaft 732 includes machined ends 738 that provide a secure alignment of shaft 732 and journals 734 when shaft 732 is inserted into a journal shaft recess 740. Similarly, journals 734 include an alignment shoulder 742 for receiving, aligning, and retaining spur gears 736. In one embodiment, alignment shoulder 742 includes a predetermined spline, such as hexagonal, that substantially eliminates rotation of spur gear 736 on journal shoulder 742. In one embodiment, journals shoulder 742 and/or spur gears 736 include hardened circular ends to provide bearing support in the ring plate 200. While assembly 730 is shown having 5 separate components, assembly 730 can include 5, 4, 3, 2, or 1 pieces. For example, journal 734 can have gears 736 integrally machined into journal 734 (shown in FIG. 20B) forming an assembly of 3 components or pieces (shown in FIG. 20C). Additionally, assembly 730 can be assembled in any suitable manner to form a single component, including, but not limited to pressing, fusing, and welding. FIG. 21A is a perspective view of rotor 100 with crankshaft 18, crossover seals 300, and piston assembly 400 positioned therein. FIG. 21B is a perspective view of power module 12 with crankshaft 18, crossover seals 300, and piston assembly 400 positioned therein.

Housing and Sleeve

Figure 22:
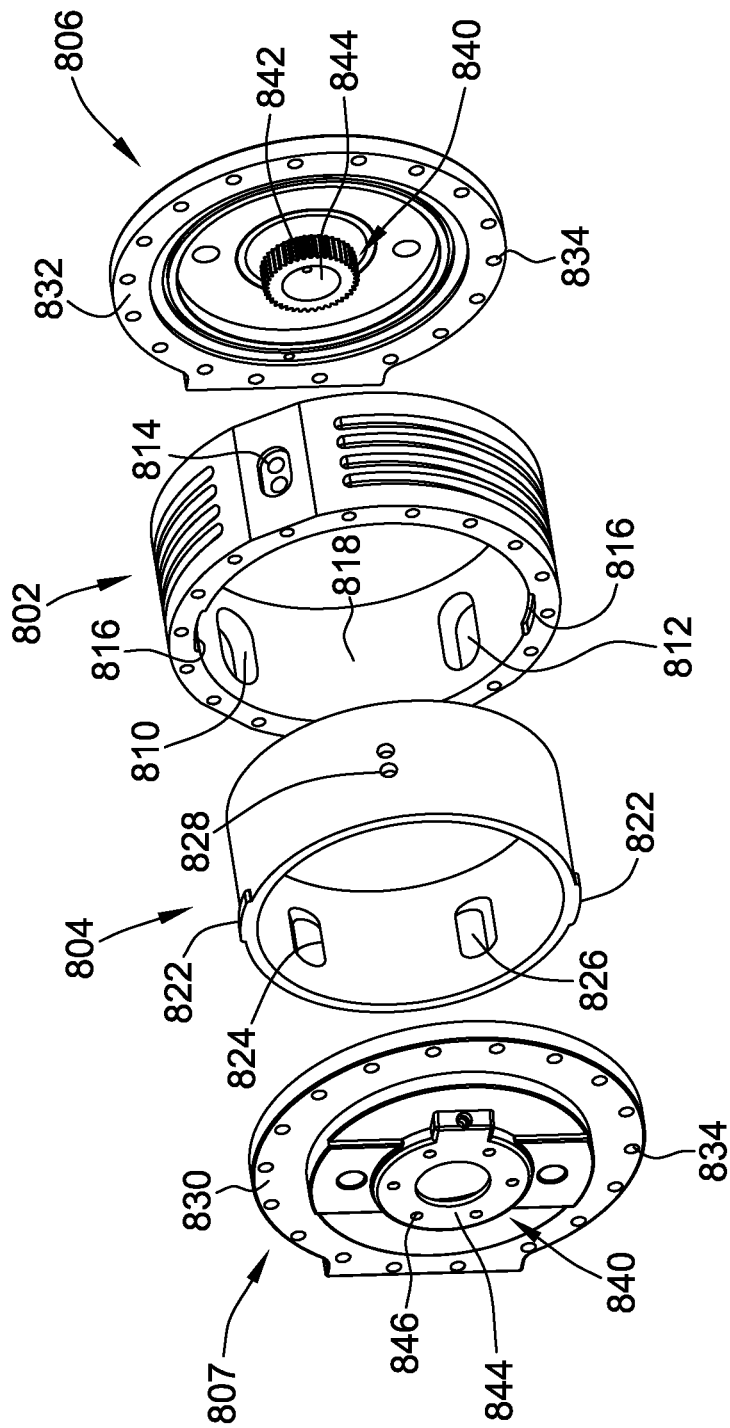
Figure 23:
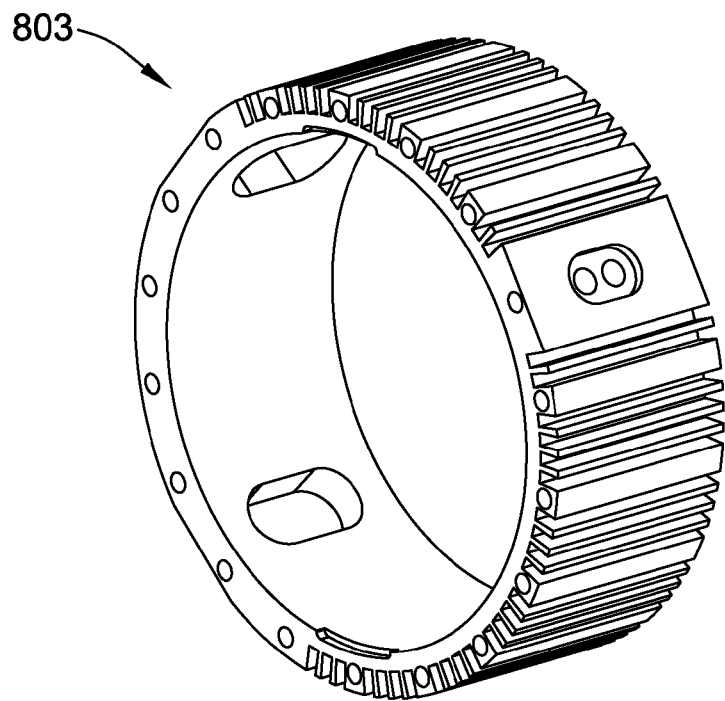

FIG. 22 is an exploded view of an exemplary housing assembly 800, such as housing assembly 14 shown in FIG. 2. Housing assembly 800 includes a housing 802, a sleeve 804, and two cover plates 806 and 807. In the exemplary embodiment, housing 802 is fabricated by casting. Alternatively, housing 802 can be fabricated through an extrusion process, as can be seen by an alternative housing 803, shown in FIG. 23. Housing 802 includes a housing inlet 810, a housing outlet 812, at least one entry point 814, and an access point (not shown). Housing inlet 810 is configured to receive a gas, gas and fuel mixture, and/or a liquid through force via pressure or sucked in via a vacuum, and housing outlet 812 is configured to expel the received gas, combusted gas, and/or liquid. In one embodiment, at least one entry point 814 is configured to enable electrical igniting (e.g., spark or plasma) or heating (e.g., glow plugs) to combustion chambers. In another embodiment, at least one entry point 814 is configured to enable introduction (e.g., direct injection) of a fuel (e.g., gasoline, diesel, alcohol, natural gas) and/or combustion aiding atomized liquids (e.g., water, urea). In another embodiment, at least one access point enables monitoring devices to sense engine performance including, but not limited to, chamber temperature, pressure, displacement, velocity, acceleration/knock, flow, humidity, and chemical composition sensing. In the exemplary embodiment, main unit 802 includes two tab recesses or flats 816 for retaining sleeve 804 inside housing 802 to substantially prevent sleeve from spinning and/or rotating.

Sleeve 804 is configured to act as an intermediary part between housing 802 and power module 12. Sleeve 804 is designed to be scalable from 50 milliliters to over 200 liters through an increase either in chamber (and piston) size or a stacking of power modules or both. Sleeve 804 is fabricated to interface statically, via a tight tolerance press or clamp, with an inner surface 818 of housing 802 around an outer surface perimeter 820 of sleeve 804 along all or a part of an axial length of sleeve 804. In the exemplary embodiment, the sleeve includes tabs or flats 822 that mate with housing recesses or flats 816. Similar to housing 802, sleeve 804 includes an inlet 824, an outlet 826, at least one entry point 828, and an access point (not shown). Sleeve 804 interfaces statically with main unit 802 around housing inlet 810, housing outlet 812, and at least one entry point 814 to provide a substantially leak-free flow path connection (e.g., not a pass-through) with inlet 824, outlet 826, and at least one entry point 828 respectively.

Sleeve 804 can have a varied wall thickness depending on design demands and sizing. In one embodiment, the sleeve wall thickness ranges from 0.1 inches to 0.75+ inches. In the exemplary embodiment, sleeve 804 wall thickness is between 0.15 inches and 0.5 inches. Alternatively, sleeve 16 can have any wall thickness that facilitates sealing as described herein.

Sleeve 16 can utilize housing 802 as a mechanical support for back-up on outer diameter 802 for increased hoop stress and mechanical integrity. Additionally, sleeve 16 can function as a heat conductor to move heat away from combustion chambers and into housing 802. Sleeve 804 provides improved serviceability by allowing a worn or contaminant gouged power module crossover seal interface surface to be easily replaced without requiring replacement of an entire housing.

The use of housing 802 and sleeve 804 enables the material not in direct contact with power module crossover seals 300, (i.e., housing 802), to be made from a lighter weight and better heat conducting material since it does not receive any wear from seals 300. Additionally, the use of sleeve 804 enables the surface contacting the power module's crossover seals 300 to be made from a heavier, stronger, longer wearing, and lower coefficient of friction material to endure the wear. As such, sleeve 804 interfaces with power module 12 dynamically through crossover seals 300 to provide a seating-in, sealing, and wear surface for crossover seals 300. Sleeve 804 also forms an outward most chamber sliding surface area for pistons in power module 12.

Figure 24:
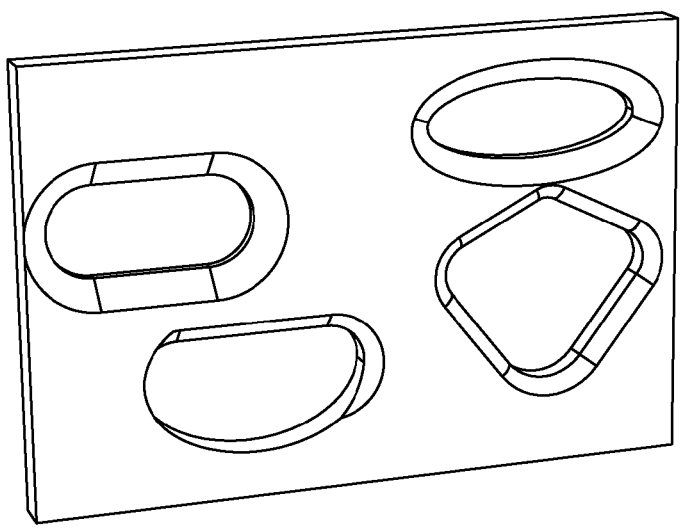

The use of sleeve 804 enables a flow path through housing inlet 810 and housing outlet 812 to be varied in cross-sectional area through sleeve changes. For example, intake 824 having a smaller cross-section shape than housing inlet 810 enables intake 824 to reduce the flow path through housing inlet 810 to the cross-sectional size and/or shape of intake 824. As such, ports 823, 824, and 826 can change a flow path into and out of combustion chambers. Changing a cross-sectional area of a flow path is similar to changing a valve size, which affects a duration and final chamber charge and/or discharge. Such a variation is similar to a cam lobe height affecting lift and cam lobe rise angle affecting lift rate, which affects duration and flow rate in an engine. In one embodiment, a port "width", defined as the maximum dimension parallel with the sleeve axis, and a port "length", defined as the maximum dimension perpendicular to the sleeve axis and along the sleeve's inner surface circumference. In this embodiment, "width" is akin to a lift rate and "length" is akin to a duration. A square port geometry with a side parallel to crossover seal 300 would give immediate high flow, which would simulate a very high lift rate and would have a long duration. A square port geometry with a diagonal perpendicular or parallel to crossover seal 300 (e.g., a diamond) would give linear gradual increase to a high flow, which would simulate a nominal lift rate and would have a very long duration. As shown in FIG. 24, oriented rectangles, circles, oriented ovals, oriented triangles, and virtually any geometry of port cross sectional shape can be implemented for a variety of engine flow and charged/discharged chamber volumes for a given power module RPM.

In one embodiment, sleeve 804 enables a flow path entry or exit angle through housing inlet 810 and housing outlet 812 to be varied through sleeve changes. As such, having a housing inlet 810 and/or housing outlet 812 centerline non-continuous with that of sleeve intake 824 and sleeve exhaust 826 affects flow path angles through housing inlet 810 and housing outlet 812 relative to a location of piston head 402. As such, housing inlet 810 and housing outlet 812 flow path centerlines can be brought closer together or farther apart by use of sleeve 804 thus controlling the overlap or time in which both housing inlet 810 and housing outlet 812 are both open to the same chamber.

In another embodiment, sleeve 804 enables flow paths through housing inlet 810 and housing outlet 812 to be varied in axial neck-down or open-up geometries through sleeve changes. Flow through housing inlet 810 and/or housing outlet 812 going neck down in cross-sectional area from sleeve 804 outer surface to sleeve 804 inner surface will increase gas velocity flow through sleeve inlet 824 and reduce the velocity through sleeve outlet 826. Alternatively, flow through housing inlet 810 and/or housing outlet 812 being spread out in cross sectional area going from sleeve 804 outer surface to sleeve 804 inner surface will decrease gas velocity flow through sleeve inlet 824 and increase velocity flow through sleeve outlet 826. Such an embodiment supports controlling the duration or time in which a passing chamber sees housing inlet 810 open or housing outlet 812 open in degrees of power module rotation. As such, sleeve can be configured to affect duration, which can, in turn, affect charge and/or discharge velocity impacting engine torque and engine horsepower.

In another embodiment, sleeve 804 enables housing inlet 810 and housing outlet 812 relative centerline locations, and hence timing, to be varied via the circumferential positioning of the intake 824 and exhaust 826 of assembly 804. Where the trailing edge of a chamber's crossover seal tangent line is relative to the trailing edge of exhaust port 826 on sleeve's inner surface and where the leading edge of a chamber's crossover seal tangent line is relative to the leading edge of the intake 824 on the sleeve's inner surface affects how long intake 824 and exhaust 826 are open together into a chamber. As such, entering intake 824 can help push out escaping exhaust and escaping exhaust can help draw in entering intake air.

In yet another embodiment, sleeve 804 enables the position of injector ports 814, for direct injection, to be varied relative to piston assembly bottom dead center (BDC) through sleeve changes. As such, sleeve 804 can affect and/or change fuel timing by simply changing sleeve 804 in housing 800. Likewise, sleeve 804 enables the position of spark plug port 814 to be varied relative to piston assembly top dead center (TDC) through sleeve changes. As such, sleeve 804 can affect and/or change typical ignition timing. Additionally, port variations also enable engine 10 to run on different fuel types by utilizing a sleeve 804 which can enable engine 10 to operate according to the requirements of a particular fuel type.

Referring back to FIG. 22, a first cover plate 806 and a second cover plate 807 are used to enclose and seal engine 10. In the exemplary embodiment, each cover plate 806 and 807 includes an outer face 830 and an inner face 832. In one embodiment, plate 806 includes a circular protrusion from its inner surface (not shown) whose outer diameter will mate with the inner diameter sleeve bore. The sleeve 804 outer diameter will be located in the inner diameter of housing 802. These centerline aligning features will keep power module 12 centered optimally in sleeve 804 before end plates 806 are secured to housing 802 by a bolts or similar fastening devices.

In one embodiment, end plate 806 includes a sun gear assembly 840. In another embodiment, both endplates 806 and 807 include sun gear assembly 840. Sun gear assembly 840 includes a sun gear 842 located on inner face 832 that is coupled to sun gear lock 844 located on outer face 830. When assembled, sun gear 842 mates with spur gears 736 shown in FIG. 20 of piston assemblies 22 in a planetary fashion to enable piston assemblies 22 and power module 12 to rotate in response or reaction to the reciprocation of piston heads 402 of piston assemblies 22. Sun gear lock 844 includes oblong (not shown) bores 846 having bolts seated therein for preventing a rotation of sun gear 842. Releasing lock 844 enables sun gear 842 to rotate. Rotating sun gear 842 enables a rotation of power module 12 which can in turn affect piston positioning through a rotational cycle versus port locations. Changing piston positioning through a rotational cycle can also affect the power curve versus RPM of engine 10. In one embodiment, a power curve versus RPM of engine 10 can be modified without opening engine 10 by releasing lock 844 and rotating sun gear 842 to a desired and/or predetermined location.

Figure 25:
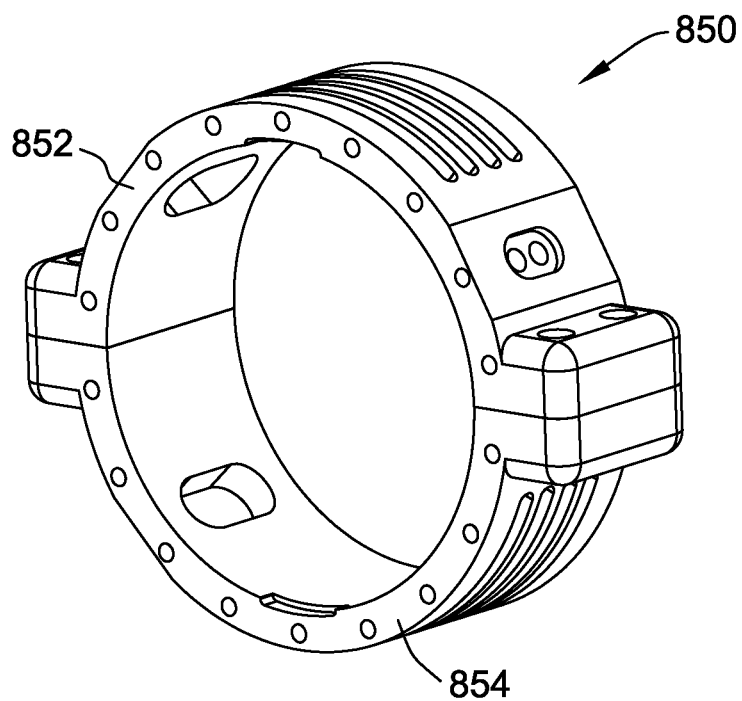
Figure 26:
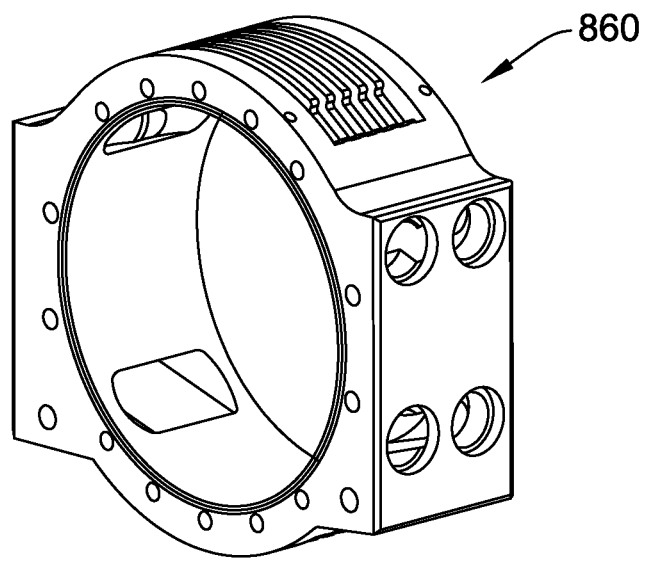
FIG. 26 is a perspective view of a housing that can be used for a pump.

FIG. 25 is a perspective view of an alternative housing 850 that can be used with sleeve 804 shown in FIG. 22. Housing 850 includes a first unit 852 that couples to second unit 854. In the exemplary embodiment, housing 850 is configured to separate to provide a simplified manner for removing and/or replacing sleeve 804 that may be used therein. FIG. 26 is a perspective view of a housing 860 that can be used for a pump.

Exemplary embodiments of a rotary internal combustion engine are described above in detail. The methods and systems are not limited to the specific embodiments described herein, but rather, components of systems and/or steps of the methods may be utilized independently and separately from other components and/or steps described herein. For example, the methods may also be used in combination with other type systems and methods, and are not limited to practice with only the engine systems and methods as described herein. Rather, the exemplary embodiment can be implemented and utilized in connection with many other compressor and pump applications. It should be noted that while the embodiments have been described to include an internal combustion engine, the engine described herein can function as a pneumatic compressor or hydraulic pump that transforms mechanical rotational movement into pressure or vacuum which can be used for work.

Although specific features of various embodiments of the disclosure may be shown in some drawings and not in others, this is for convenience only. In accordance with the principles of the disclosure, any feature of a drawing may be referenced and/or claimed in combination with any feature of any other drawing.

This written description uses examples in the disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A rotary internal combustion engine comprising:
    a power module;
    a housing including an intake and an exhaust, wherein the housing is configured to retain the power module, the housing comprising a first unit and a second unit coupleable to the first unit; and
    a sleeve configured to be removably coupled in the housing, the sleeve including a sleeve intake, a sleeve exhaust, an injector port, and a spark plug port, the first unit and the second unit configured to interface statically with the sleeve via one of a tight tolerance press or clamping engagement to form a substantially leak-five intake flow path between the housing intake and the sleeve intake, and a substantially leak-free exhaust flow path between the housing exhaust and the sleeve exhaust, wherein the sleeve is a first sleeve, the first sleeve configured to be interchangeable with a second sleeve having at least one of a sleeve intake, a sleeve exhaust, an injector port, and a spark plug port different than the corresponding sleeve intake, sleeve exhaust, injector port, and spark plug port of the first sleeve, wherein the second sleeve is configured to modify at least one of a torque output of the engine, a power output of the engine, a fuel timing of the engine, and an ignition timing of the engine, compared to the first sleeve.

2. A rotary internal combustion engine according to claim 1, wherein the power module includes at least one piston assembly having a piston head coupled to a piston crankshaft assembly.

3. A rotary internal combustion engine according to claim 2, wherein the piston head includes at least one combustion recess configured to provide a combustion zone on a top surface of the piston head.

4. A rotary internal combustion engine according to claim 3, wherein the piston head is coupled to at least one piston sealing assembly configured to substantially seal the at least one combustion zone.

5. A rotary internal combustion engine according to claim 4, wherein the at least one piston sealing assembly includes a spring member configured to urge a first seal of the sealing assembly in a first direction and urge a second seal of the sealing assembly in a second direction different than the first direction.

6. A rotary internal combustion engine according to claim 1, wherein the power module is coupled to at least one crossover seal assembly configured to substantially seal combustion chambers within the housing.

7. A rotary internal combustion engine according to claim 6, wherein the crossover seal assembly includes a spring member configured to urge a first seal of the crossover seal assembly in a first direction, urge a second seal of the crossover seal assembly in a second direction different than the first direction, and urge both seals in a third direction different than the first and second directions.

8. A rotary internal combustion engine according to claim 6, wherein the crossover seal assembly includes a fluid or gas pressurization configured to urge a first seal of the crossover seal assembly in a first direction, urge a second seal of the crossover seal assembly in a second direction different than the first direction, and urge both seals in a third direction different than the first and second directions.

9. A rotary internal combustion engine according to claim 6, wherein the crossover seal assembly has a width larger than an arc length greater than the larger of an injection hole or ignition device hole in at least one of the housing and the first sleeve.

10. A rotary internal combustion engine according to claim 1, wherein at least one of the sleeve intake and the sleeve exhaust of the second sleeve is different than the corresponding sleeve intake and sleeve exhaust of the first sleeve and is configured to modify a torque output of the engine as compared to the first sleeve.

11. A rotary internal combustion engine according to claim 1, wherein at least one of the sleeve intake and the sleeve exhaust of the second sleeve is different than the corresponding sleeve intake and sleeve exhaust of the first sleeve and is configured to modify a power output of the engine as compared to the first sleeve.

12. A rotary internal combustion engine according to claim 1, wherein at least one of the sleeve intake and the sleeve exhaust of the second sleeve is different than the corresponding sleeve intake and sleeve exhaust of the first sleeve and is configured to modify at least one of a fuel timing of the engine and an ignition timing of the engine as compared to the first sleeve.

13. A rotary internal combustion engine according to claim 1, further comprising at least one ring seal assembly and two cover plates coupled to the housing, wherein the at least one ring seal assembly is positioned between the power module and at least one cover plate coupled to the housing, wherein a compression of ring seal assembly is at least one of pneumatically controlled and hydraulically controlled.

14. A rotary internal combustion engine according to claim 1, wherein the housing includes at least one cover plate having a sun gear assembly that is configured to modify at least one of a power curve versus revolutions per minute and a torque curve versus revolutions per minute.

15. A housing assembly for use in a rotary internal combustion engine, the housing assembly comprising:
a main unit including an intake and an exhaust, wherein the main unit is configured to retain a power module for the internal combustion engine, the main unit comprising a first unit and a second unit coupleable to the first unit; and
a sleeve configured to be removably coupled in the main unit, the sleeve including a sleeve intake, a sleeve exhaust, an injector port, and a spark plug port, the first unit and the second unit configured to interface statically with the sleeve via one of a tight tolerance press or clamping engagement to form a substantially leak-free intake flow path between the main unit intake and the sleeve intake, and a substantially leak-free exhaust flow path between the main unit exhaust and the sleeve exhaust, wherein the sleeve is a first sleeve, the first sleeve configured to be interchangeable with a second sleeve having at least one of a sleeve intake, a sleeve exhaust, an injector port, and a spark plug port different than the corresponding sleeve intake, sleeve exhaust, infector port, and spark plug port of the first sleeve, wherein the second sleeve is configured to modify at least one of a torque output of the engine, a power output of the engine, a fuel timing of the engine, and an ignition timing of the engine, compared to the first sleeve.

16. A housing assembly according to claim 15, wherein at least one of the sleeve intake and the sleeve exhaust of the second sleeve is different than the corresponding sleeve intake and sleeve exhaust of the first sleeve and is configured to modify at least one of a torque output of the engine, a power output of the engine, a fuel timing of the engine, and an ignition timing of the engine as compared to the first sleeve.

17. A method of assembling a rotary internal combustion engine, the method comprising
providing a housing including an intake, an exhaust, a first unit and a second unit;
decoupling a first sleeve from within the housing, the first sleeve including a sleeve intake, a sleeve exhaust, an injector port, and a spark plug port;
interchanging the first sleeve with a second sleeve having at least one of a sleeve intake, a sleeve exhaust, an injector port, and a spark plug port different than the corresponding sleeve intake, sleeve exhaust, injector port, and spark plug port of the first sleeve to modify at least one of a torque output of the engine, a power output of the engine, a fuel timing of the engine, and an ignition timing of the engine, wherein interchanging the first sleeve with the second sleeve includes coupling the second sleeve within the housing such that the first unit and the second unit interface statically with the second sleeve via one of a tight tolerance press or claming engagement to form a substantially leak-free intake flow path between the housing intake and the sleeve intake of the second sleeve, and a substantially leak-free exhaust flow path between the housing exhaust and the sleeve exhaust of the second sleeve; and
positioning a power module in the housings.

18. A method according to claim 17, wherein coupling a power module to the housing further comprises coupling a power module including at least one crossover seal assembly configured to substantially seal combustion chambers within the housing.

19. A method according to claim 17, wherein at least one of the sleeve intake and the sleeve exhaust of the second sleeve is different than the corresponding sleeve intake and sleeve exhaust of the first sleeve and is configured to modify at least one of a torque output of the engine, a power output of the engine, a fuel timing of the engine, and an ignition timing of the engine as compared to the first sleeve.

20. A method according to claim 17, further comprising positioning a ring seal assembly between the power module and at least one cover plate coupled to the housing, wherein a compression of ring seal assembly is at least one of pneumatically controlled and hydraulically controlled.

21. A housing assembly according to claim 15, wherein at least one of the sleeve intake and the sleeve exhaust of the second sleeve is different than the corresponding sleeve intake and sleeve exhaust of the first sleeve and is configured to modify at least one of the intake flow path and the exhaust flow path as compared to the first sleeve.

* * * * *